(12) United States Patent
Gatto et al.

(10) Patent No.: US 8,640,153 B2
(45) Date of Patent: *Jan. 28, 2014

(54) METHODS AND SYSTEMS FOR INTERACTIVE TELEVISION

(75) Inventors: Jean-Marie Gatto, London (GB); Luis Nobre, London (GB)

(73) Assignee: Korishima Property LLC, Dover, DE (US)

( * ) Notice: Subject to any disclaimer, the term of this patent is extended or adjusted under 35 U.S.C. 154(b) by 1257 days.

This patent is subject to a terminal disclaimer.

(21) Appl. No.: 11/265,598

(22) Filed: Nov. 1, 2005

(65) Prior Publication Data

US 2006/0174266 A1 Aug. 3, 2006

Related U.S. Application Data

(63) Continuation of application No. 09/932,282, filed on Aug. 17, 2001, now Pat. No. 7,636,931.

(51) Int. Cl.
*H04H 60/56* (2008.01)
(52) U.S. Cl.
USPC .......... 725/12; 725/10; 725/43; 725/47; 725/52; 725/59; 715/779; 348/373; 348/374; 348/375; 348/376
(58) Field of Classification Search
USPC .......... 725/43, 47, 52, 59, 10, 12; 715/779; 348/373–376
See application file for complete search history.

(56) References Cited

U.S. PATENT DOCUMENTS

| 4,829,558 A | 5/1989 | Welsh |
| 4,860,123 A | 8/1989 | McCalley |
| 5,170,427 A | 12/1992 | Guichard et al. |
| 5,247,347 A | 9/1993 | Litteral |
| 5,247,575 A | 9/1993 | Sprague |
| 5,305,435 A * | 4/1994 | Bronson ............ 715/777 |

(Continued)

FOREIGN PATENT DOCUMENTS

EP 0 477 786 B1 4/1992
EP 0700205 A2 3/1996

(Continued)

OTHER PUBLICATIONS

Replay TV Hardware Platform, *B2B Solutions, Replay TV: Hardware Platform*, pp. 1-3. http://ww.replaytv.com/b2b/hardware.htm (Printed on Jun. 28, 2001).

(Continued)

*Primary Examiner* — Pankaj Kumar
*Assistant Examiner* — Sahar Baig
(74) *Attorney, Agent, or Firm* — Turocy & Watson, LLP

(57) ABSTRACT

An interactive TV device is configured to receive and process multiple broadband input streams simultaneously. The device includes functionality to perform as a Web browser, HF, cable and satellite TV receiver, a digital PVR, an interactive TV set-top box, an advanced central processing unit and a video-conferencing device, thanks to an integrated videoconferencing camera. The present interactive TV device is configured to manage all multimedia sources identically, whether the input is a TV channel, a Web page, or a video stream played back from a data carrier such as a DVD, for example. The present interactive TV device is also configured to enable a user to watch and record a plurality of video streams simultaneously and to display them on four independently manageable quarter screen segments.

42 Claims, 11 Drawing Sheets

(56) References Cited

U.S. PATENT DOCUMENTS

| | | | |
|---|---|---|---|
| 5,333,266 A | | 7/1994 | Boaz et al. |
| 5,359,367 A | | 10/1994 | Stockill |
| 5,365,264 A | | 11/1994 | Inoue |
| 5,410,326 A | | 4/1995 | Goldstein |
| 5,479,203 A | | 12/1995 | Kawai et al. |
| 5,534,913 A | | 7/1996 | Majeti |
| 5,562,550 A | | 10/1996 | Chartrand |
| 5,594,509 A | * | 1/1997 | Florin et al. ............ 725/43 |
| 5,594,789 A | | 1/1997 | Seazholtz |
| 5,606,374 A | * | 2/1997 | Bertram ............ 725/37 |
| 5,608,447 A | | 3/1997 | Farry |
| 5,621,456 A | * | 4/1997 | Florin et al. ............ 725/43 |
| 5,629,733 A | | 5/1997 | Youman et al. |
| 5,684,918 A | | 11/1997 | Abecassis |
| 5,694,546 A | | 12/1997 | Reisman |
| 5,737,029 A | * | 4/1998 | Ohkura et al. ............ 725/56 |
| 5,757,371 A | * | 5/1998 | Oran et al. ............ 715/779 |
| 5,812,929 A | | 9/1998 | Tsutsui et al. |
| 5,903,829 A | | 5/1999 | Anderson et al. |
| 5,905,521 A | | 5/1999 | Gatto |
| 5,953,052 A | | 9/1999 | McNelley et al. |
| 6,002,401 A | * | 12/1999 | Baker ............ 715/839 |
| 6,037,933 A | * | 3/2000 | Blonstein et al. ............ 715/721 |
| D435,561 S | | 12/2000 | Pettigrew |
| 6,163,335 A | | 12/2000 | Barraclough |
| 6,215,526 B1 | | 4/2001 | Barton |
| 6,233,389 B1 | | 5/2001 | Barton |
| 6,236,395 B1 | | 5/2001 | Sezan et al. |
| 6,262,722 B1 | * | 7/2001 | Allison et al. ............ 725/39 |
| 6,469,746 B1 | * | 10/2002 | Maida ............ 348/564 |
| 6,507,366 B1 | | 1/2003 | Lee |
| 6,530,083 B1 | * | 3/2003 | Liebenow ............ 725/46 |
| 6,950,772 B1 | | 9/2005 | Callway |
| 6,976,228 B2 | * | 12/2005 | Bernhardson ............ 715/830 |
| 7,038,709 B1 | * | 5/2006 | Verghese ............ 348/169 |
| 7,051,291 B2 | * | 5/2006 | Sciammarella et al. ............ 715/838 |
| 2002/0051074 A1 | * | 5/2002 | Kawaoka et al. ............ 348/376 |
| 2002/0059588 A1 | * | 5/2002 | Huber et al. ............ 725/35 |
| 2002/0060750 A1 | * | 5/2002 | Istvan et al. ............ 348/569 |
| 2002/0106018 A1 | | 8/2002 | D'Luna et al. |
| 2002/0126703 A1 | * | 9/2002 | Kovacevic ............ 370/487 |
| 2002/0136538 A1 | * | 9/2002 | Chen ............ 386/111 |
| 2003/0014489 A1 | * | 1/2003 | Inala et al. ............ 709/204 |
| 2003/0028883 A1 | | 2/2003 | Billmaier et al. |
| 2004/0093455 A1 | | 5/2004 | Duncan et al. |
| 2005/0039214 A1 | | 2/2005 | Lorenz et al. |
| 2005/0289617 A1 | | 12/2005 | Safadi et al. |
| 2006/0248555 A1 | | 11/2006 | Eldering |
| 2007/0118855 A1 | | 5/2007 | Jaff et al. |
| 2007/0124755 A1 | | 5/2007 | Shintani |

FOREIGN PATENT DOCUMENTS

| | | |
|---|---|---|
| EP | 0700205 A3 | 3/1996 |
| EP | 0 836 324 A2 | 4/1998 |
| EP | 0 836 324 A3 | 4/1998 |
| GB | 2 244 896 A | 12/1991 |
| GB | 2353658 A | 2/2001 |
| JP | 2001157197 A | 6/2001 |
| WO | WO 93/15466 A1 | 1/1993 |
| WO | WO 96/41476 A1 | 12/1996 |
| WO | WO 00/07368 | 3/1999 |
| WO | WO 99/52279 | 3/1999 |
| WO | WO 00/18108 | 7/1999 |
| WO | WO 00/28736 | 11/1999 |
| WO | WO 00/58833 | 3/2000 |
| WO | WO 00/58834 | 3/2000 |
| WO | WO 00/58967 | 3/2000 |
| WO | WO 00/59223 | 3/2000 |
| WO | WO 00/62298 | 3/2000 |
| WO | WO 00/62299 | 3/2000 |
| WO | WO 00/62533 | 3/2000 |
| WO | WO 00/67475 | 4/2000 |
| WO | WO 00/31974 A2 | 6/2000 |
| WO | WO 01/06370 A1 | 7/2000 |
| WO | WO 01/22729 A1 | 9/2000 |
| WO | WO 00/59214 | 10/2000 |
| WO | WO 01/46843 | 12/2000 |
| WO | WO 01/47238 A2 | 12/2000 |
| WO | WO 01/47249 A2 | 12/2000 |
| WO | WO 01/47257 A1 | 12/2000 |
| WO | WO 01/47273 A1 | 12/2000 |
| WO | WO 01/47279 A2 | 12/2000 |

OTHER PUBLICATIONS

B2B Solutions, Replay TV, *Replay TV B2B Solutions Overview: Enabling Personalized Home Entertainment*, pp. 1-3, http://www.replaytv.com/b2b/b2solutions.htm (Printed on Jun. 28, 2001).

What is TiVo-Tech Specs, *What is TiVo? Technical Specifications*, pp. 1-2, http://www.tivo.com/discover/tech_specs.asp?frames=yes (Printed on Jun. 28, 2001).

Ultimate TV: Questions, *Ultimate TV From Microsoft, Common Questions*, pp. 1-6, wysiwyg://134/http://www.ultimatetv.com/questions.htm (Printed on Jun. 28, 2001).

International Search Report mailed Dec. 10, 2002, in corresponding International Application No. PCT/US02/24528, filed Aug. 1, 2002.

Written Opinion mailed May 26, 2005, in corresponding International Application No. PCT/US02/24528, filed Aug. 1, 2002.

Online! 2000, XP002344992, http://manuals.info.apple.com/en/iMacG3_2000UserManual.pdf, retrieved Sep. 14, 2005.

Supplementary European Search Report completed Sep. 16, 2005, in corresponding European Application No. EP 02 75 6901 (5pgs).

Final Office Action mailed Jan. 2, 2008 in U.S. Appl. No. 09/932,282, filed Aug. 17, 2001.

Office Action mailed Jan. 11, 2006, in parent U.S. Appl. No. 09/932,282, filed Aug. 17, 2001.

Final Office Action mailed Aug. 24, 2006, in parent U.S. Appl. No. 09/932,282, filed Aug. 17, 2001.

Office Action mailed Jul. 18, 2007, in parent U.S. Appl. No. 09/932,282, filed Aug. 17, 2001.

Office Action mailed Apr. 15, 2008, in parent U.S. Appl. No. 09/932,282, filed Aug. 17, 2001.

International Preliminary Examination Report mailed May 17, 2006, in related International Application No. PCT/US02/24528, filed Aug. 1, 2002.

Jacob Nielsen's Alertbox for Feb. 1, 1997; WebTV Usability Review http://www.useit.com/alertbox/9702a.html; printed Feb. 27, 2007.

Gerard O'Driscoll, "The Essential Guide to Digital Set-top Boxes and Interactive TV," TK6679.3 o37 1999, 99-054468, 621.388-DC21.

* cited by examiner

METHODS AND SYSTEMS FOR INTERACTIVE TELEVISION

This is a continuation of previously filed copending application Ser. No. 09/932,282, filed Aug. 17, 2001, which application is hereby incorporated herein in its entirety and from which priority is hereby claimed under 35 U.S.C. §120.

BACKGROUND OF THE INVENTION

1. Field of the Invention

The invention pertains generally to the field of interactive television systems. More particularly, the present invention is drawn to methods and systems for enabling users to easily customize and manage virtually all forms of electronic communications including, for example, all television, video recording, videoconferencing and Internet-related activities.

2. Description of the Related Art

Conventional broadcast or cable television generally is limited to the transfer of information from a content provider to the user. Interactive television, although long forecasted, has thus far failed to materialize as a commercially viable product. In its most basic form, interactive television (hereafter "interactive TV") includes a TV system in which the flow of information is or can be bidirectional. Generally, conventional interactive TV enables the viewer to interact at some level with the TV and offers an enhanced level of service to the user, which may include video on demand, games and home shopping and banking. Moreover, interactive TV has come to include such functions as PVRs, or personal video recorders, which combine a large storage capacity with a user interface to enable the user to digitally record and playback selected TV shows or events. By significantly simplifying the process of selecting and recording television programs, PVRs have accelerated the trend initiated by the videocassette recorder (VCR) toward time shifted viewing; that is, viewing a previously recorded program at the user's convenience rather than at a schedule dictated by the content provider.

However, current PVRs are believed to be limited in their functionality as they are essentially limited to recording live television and providing the user with access to a number of services such as weather, financial information, TV guide, etc. Conventional interactive TV devices such as those marketed by Tivo, Inc. are believed to be somewhat limited to rendering whatever video stream is provided by the content provider on the user's television screen. In many cases, early so-called interactive TV devices are little more than conventional TV receivers onto which digital decoders and mass storage devices have been grafted. Moreover, such devices inherently provide (often by design) the content provider with a great deal of information concerning the user's viewing habits and the nature of the information selected by the user. What is needed, therefore, is to provide an improved an interactive TV device that affords the user with complete privacy in his or her choice of content and the manner in which such content is viewed, processed and stored. What is also needed is an interactive TV device having a very large bandwidth and processing power, to enable it to receive and process multiple broadband input streams simultaneously. Also needed are devices and systems to provide the user with the means for practical, reliable and high quality full motion videoconferencing for personal, e-commerce applications, gaming and entertainment purposes.

SUMMARY OF THE INVENTION

An embodiment of the present invention is an interactive device that is configured to display at least one selectively viewable pull out strip on a display. Each pull out strip may originate from a predetermined one of the four sides of the display and may be configured to extend toward an opposite one of the four sides in response to user interaction. Each pull out strip may display menu selections, icons and/or television channel logos, for example.

According to further embodiments, the device may be configured to display four selectively viewable pull out strips on the display. Each of the four selectively viewable pull out strips may originate from a respective one of the four sides of the display and may extend toward an opposite one of the four sides, responsive to user interaction. Each of the four pull out strips may be configured to be pulled out from one of the four sides of the display upon selection by an input device, each of the four pull out strips further being configured to be out of view when not selected or in use. One or more of the pull out strips may be scrollable. One or more of the icons may include an image of a user, the selection of which invoking a user management general module that is configured to enable the creation, modification and deletion of a user and a user profile. The user profile may include one or more of the following: a unique user identification number; a user logo, the user logo including an image of the user; an identification of a last television channel selected by the user; a number of television channels defined for the user; a television channel table, the television channel table including a list of television channels assigned to the user; a personal password of the user; a default recording quality for recordings made for the user, and an applications table for the user, the application table defining access rights for the user to the applications loaded onto the interactive TV device and a location of user and application-specific data. The device may be further configured to display incoming signals either in a full screen format or in a format including up to four independent quarter screen segments on the display. The four independent quarter screen segments may be configured to display a web browser, an email client, and a videoconferencing session and/or one or more television channels, for example.

The device may also include an input, the input being configured to accept a plurality of input streams; an output, the output being configured to selectively output a plurality of output streams; a first digital bus connected between the input and output, the first digital bus being uninterrupted between the input and the output; an analog bus connected between the input and the output, the analog bus including a video signal decoder coupled to the input and a video signal encoder coupled to the output, and a graphics processing assembly coupled to the first digital bus and to the analog bus. The device may be configured to treat all incoming video streams as a channel that is accessible to a user in a same manner as a television channel. Each selectively viewable pull(s) out strip may be configured to display communications-related information; television channels, and/or user and profile management information and events management and device configuration related information, for example. Each pull out strip(s) may define a first section and a second section. The first section may be configured to display at least one of menu selections and icons and the second section may be configured to display one or more television channel logos, for example. Each selectively viewable pull out strip(s) may define, when pulled out, an initially viewable zone and an initially hidden zone, the initially viewable zone being at least initially viewable when the pull out strip may be pulled out, the initially hidden zone remaining hidden from view until the pull out strip is scrolled. One or more of the pull out strips may be configured to display an icon representative of each user of the device, and each user representative icon may be configured to enable, when selected, configuration of user preferences. The user representative icon may, for example, include a photo of the user.

According to another embodiment thereof, the present invention is a method for enabling user interaction with an interactive television device, comprising displaying at least one selectively viewable pull out strip on a display, each of the at least one pull out strip originating from a predetermined one of the four sides of the display and being configured to extend toward an opposite one of the four sides in response to user interaction, each pull out strip displaying at least one of user-selectable menu selections, icons and television channel logos.

The displaying step may be configured to display four selectively viewable pull out strips on the display, each of the four selectively viewable pull out strips originating from a respective one of the four sides of the display and extending toward an opposite one of the four sides. The displaying step may be carried out with each of the four pull out strips being configured to be pulled out from one of the four sides of the display upon selection by an input device, each of the four pull out strips further being configured to be out of view when not selected or in use. The displaying step may be carried out with at least one of the four pull out strips may be scrollable. One or more of the icons may include an image of a user, the selection of which invoking a user management general software module is be configured to enable the creation, modification and deletion of a user and a user profile. The user profile may include one or more of the following: a unique user identification number; a user logo, the user logo including an image of the user; an identification of a last television channel selected by the user; a number of television channels defined for the user; a television channel table, the television channel table including a list of television channels assigned to the user; a personal password of the user; a default recording quality for recordings made for the user, and an applications table for the user, the application table defining access rights for the user to the applications loaded onto the interactive TV device and a location of user and application-specific data. The method may also include a step of displaying incoming signals either in a full screen format or in a format including up to four independent quarter screen segments on the display. The four independent quarter screen segments may be configured to display, for example, a web browser, an email client, and a videoconferencing session and/or one or more television channels. The method may also include a step of handling all incoming video streams as a channel that is accessible to a user in the same manner as a television channel. The selectively viewable pull out strips may be configured to display at least one of communications-related information; television channels, user and profile management information and events management and device configuration related information. Each of the selectively viewable pull out strips may define a first section and a second section. The first section may be configured to display at least one of menu selections and icons, and the second section may be configured to display at least one television channel logo, for example. Each of the selectively viewable pull out strips may define, when pulled out, an initially viewable zone and an initially hidden zone, the initially viewable zone being at least initially viewable when the pull out strip may be pulled out, the method further comprising a step of displaying the initially hidden zone when the pull out strip is scrolled. The method may also include a step of displaying an icon representative of each user of the device on one or more of the pull out strips, the user representative icon being configured to enable, when selected, configuration of user preferences. The user representative icon may include, for example, a photo of the user.

According to still another embodiment thereof, the present invention is a graphical user interface for helping a user to perform tasks in software. The graphical user interface may include at least one selectively viewable pull out strip, each of the at least one pull out strips being configured to originate from a predetermined one of the four sides of a display and being configured to extend toward an opposite one of the four sides in response to user interaction, each pull out strip displaying at least one of menu selections, icons and television channel logos.

The graphical user interface may be configured to display four selectively viewable pull out strips on the display, each of the four selectively viewable pull out strips originating from a respective one of the four sides of the display and extending toward an opposite one of the four sides. Each of the four pull out strips may be configured to be pulled out from one of the four sides of the display upon selection by an input device, each of the four pull out strips further being configured to be out of view when not selected or in use. One or more of the four pull out strips may be scrollable. One or more of the icons may include an image of a user, a selection of which invoking a user management general software module is configured to enable the creation, modification and deletion of a user and a user profile. The user profile may include one or more of the following: a unique user identification number; a user logo, the user logo including an image of the user; an identification of a last television channel selected by the user; a number of television channels defined for the user; a television channel table, the television channel table including a list of television channels assigned to the user; a personal password of the user; a default recording quality for recordings made for the user, and an applications table for the user, the application table defining access rights for the user to the applications and a location of user and application-specific data.

The graphical user interface may be further configured to display incoming signals either in a full screen format or in a format including up to four independent quarter screen segments on the display. The four independent quarter screen segments may be configured to display, for example, a web browser, an email client, and a videoconferencing session and/or one or more television channels. One or more of the selectively viewable pull out strip may be configured to display communications-related information; television channels and/or user and profile management information and events management and device configuration related information, for example. Each of the selectively viewable pull out strips may define a first section and a second section. The first section may be configured to display at least one of menu selections and icons, and the second section may be configured to display at least one television channel logo. One or more of the selectively viewable pull out strips may define, when pulled out, an initially viewable zone and an initially hidden zone, the initially viewable zone being at least initially viewable when the pull out strip may be pulled out, the initially hidden zone remaining hidden from view until displayed responsive to the pull out strip being scrolled. One or more of the pull out strips may be configured to display an icon representative of each user of the device, and each user representative icon may be configured to enable, when selected, configuration of user preferences. The user representative icon may include, for example, a photo of the user.

The foregoing and other features of the invention may be described in detail below and set forth in the appended claims.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Figure 1:
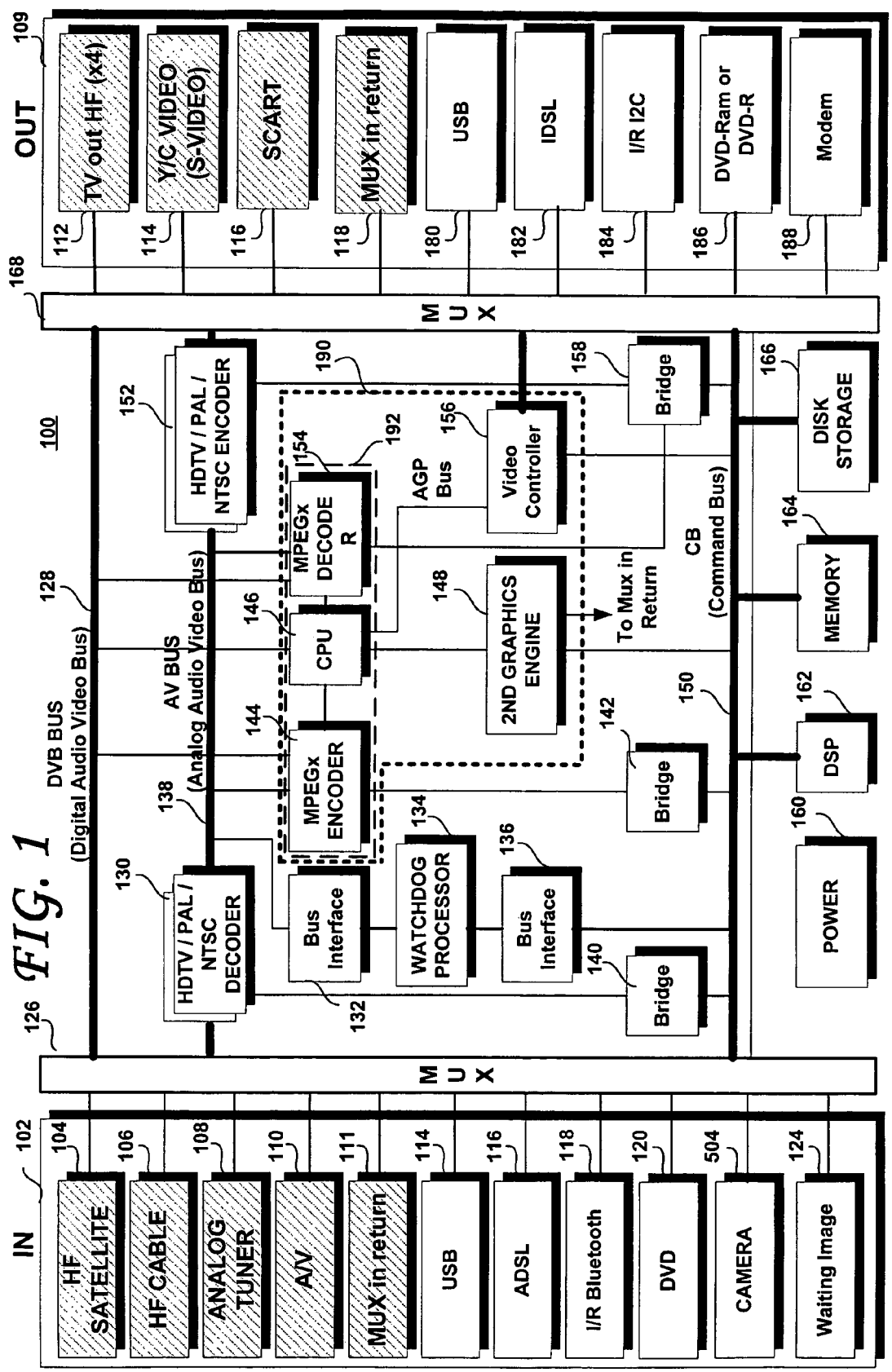
FIG. 1 is a block diagram of the signal processing circuitry of an interactive TV device according to an embodiment of the present invention.
Figure 8:
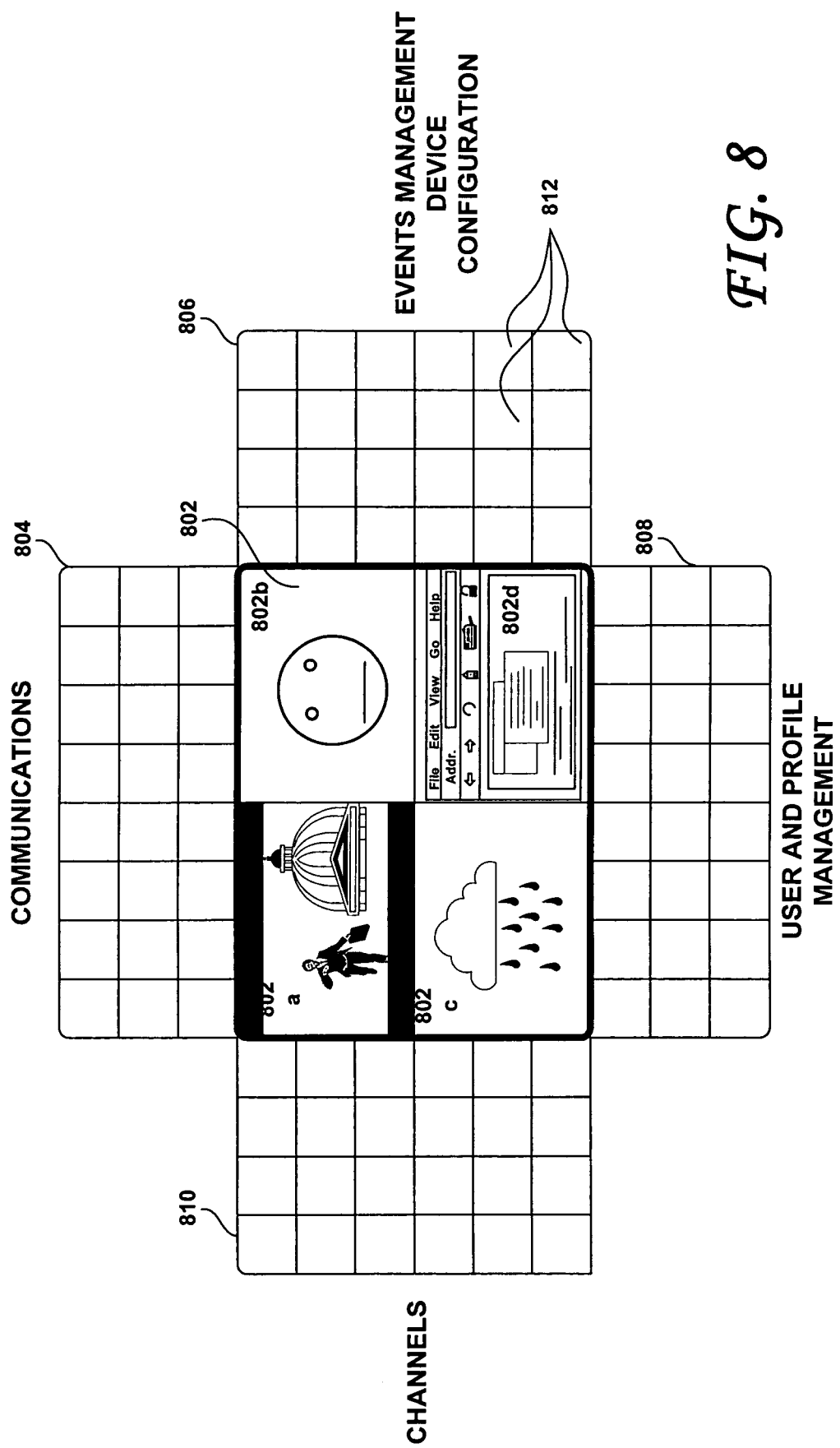
FIG. 8 shows an embodiment of the user interface of an interactive TV device, according to an embodiment of the present invention.

FIG. 1 is a block diagram of the video signal processing circuitry 100 of the interactive TV device according to an embodiment of the present invention. The present interactive TV device may best be thought of as a multi input data flow receiver. Indeed, the device signal processing circuitry 100 includes functionality to perform as a Web browser, HF, cable and satellite TV receiver, a digital PVR, an interactive TV set-top box, an advanced central processing unit and a videoconferencing device, thanks to an integrated videoconferencing camera. According to the present invention, all multimedia sources are treated and managed identically, whether the input is a TV channel (such as CNN®, for example) or a Web page (such as www.yahoo.com), etc. Moreover, the present interactive TV device also includes the ability to watch and record a plurality of MPEGx (Motion Pictures Expert Group) such as MPEG2 or the emerging MPEG4 protocol) video streams simultaneously. The present interactive TV device is designed with an architecture that is able to manage several data streams simultaneously. For example, the information input to the signal processing circuitry 100 (from whatever source) of the present interactive TV device may be displayed on four independently manageable quarter screen segments 802a, 802b, 802c and 802d, such as shown in FIG. 8. The interactive TV device of the present invention, a physical embodiment of which is depicted in FIG. 5 at reference numeral 502, may be deployed in tandem with the standalone videoconferencing camera 400 shown in FIG. 4 to create a flexible and powerful multi-point real time, full motion and secure (when the generated video streams are encrypted) videoconferencing system. Alternatively several interactive TV devices 502 may be coupled across a network to enable two or more users to carry out a videoconference.

Returning now to FIG. 1, the signal processing circuitry 100 of the interactive TV device includes a plurality of inputs, collectively referenced by 102. These inputs may include a HF satellite input 104, a HF cable input 106, and analog tuner 108, an Audio/Visual input 110, a multiplexer (Mux) in return input 111, a Universal Serial Bus (USB) input 114, an Asymmetric Digital Subscriber Line (ADSL) input 116 and/or other broadband connection to a network (including, for example, the Internet), an Infrared input and/or a Blue Tooth compatible input 118 (a communication and computing standard allowing high bandwidth, short range communications using a wireless connection; additional information on this specification may be obtained from www.bluetooth.com), a Digital Versatile Disk (DVD) input 120, an input for a video camera (such as shown at 504 in FIGS. 4 and 5) and an input for a waiting image 124 (a waiting image is an image that is displayed to the user while the system starts, such as "Please wait, system loading . . . "), for example. Other inputs and/or devices configured to feed audio and/or video streams into the circuitry 100 may also be interfaced with and/or added to the input 102. Inputs 104-124 (and/or any other inputs that may be present at 102) may be multiplexed by input mux 126 onto one of three buses 128, 138 and 150. Bus 128 is a digital bus configured to deliver digital audio and video (AV) signals. For example, the bus 128 may conform to the Digital Video Broadcasting (DVB) standard. DVB is a standard that utilizes the MPEG2 compression standard for transmission of digital video and audio. Further information concerning the DVB standard may be found at www.dvb.org. The digital bus 128 is preferably provided directly between the input mux 126 and the output mux 168, as shown. In effect, this digital AV bus 138 provides an uninterrupted path for a digital video stream from the input 102 to the output 109, to thereby provide the ability to render a video stream in full screen mode without any degradation in picture quality (i.e., without degradation of the signal-to-noise (S/N) ratio). Indeed, as the video stream may traverse the entire interactive TV device without perturbations (without needing to propagate through an intervening device), the present interactive TV device is functionally invisible within the context of full screen viewing.

The present interactive TV device may also be provided with an analog AV bus, referenced as AV Bus 138. As shown, a video signal (from whatever source) may be multiplexed by mux 126 to the AV Bus 138, whereupon it may be fed to one of a plurality of video decoders coupled to the analog AV bus 138, such as the video decoder 130. The video decoder 130 may include a PAL, SECAM and/or NTCS decoder, for example. One current implementation of the signal processing circuitry 100 of the present interactive TV device utilizes the SAA7114 decoder manufactured by Philips Semiconductors, Inc. The SAA7114 is a multistandard 9-bit digital video decoder/scaler with a four-line comb filter. Other suitable decoders may also be used, as those of skill will readily recognize. A plurality of HDTV, PAL, NTSC and/or SECAM video encoders may also be provided on the AV Bus 138, as shown at 152, which video encoders 152 are also coupled to the output multiplexer 168.

A third high speed bus such as the Command Bus (CB) 150 may be provided to interconnect various processing and storage elements with the decoders 130 and the encoders 152, among other devices. Such a bus 150 may include busses that conform to the Peripheral Component Interconnect (PCI) standard, the IC2 standard and/or some other bus architecture. A bridge 140 may interconnect each of the video encoders 152 and the bus 150, while bridge 158 may interconnect each of the video encoders 152 and the bus 150. A number of devices may be connected to the bus 150, such as one or more disk storage devices 166 (such as an Integrated Device Electronics (IDE) magnetic disk drive or drives, for example) and/or other devices such as a Digital Signal Processor (DSP) such as the Texas Instruments TMS320 line of DSPs, for example. Memory 164, such as Dynamic Random Access Memory (DRAM) or static RAM (SRAM) may also be coupled to the bus 150. For example, the circuitry 100 may include 512 Mb (or more) of DRAM memory. The disk storage 166 may include, for example, 100 Gbytes of storage space, enabling between about 100 and 300 hours of video recording, depending upon the quality of recording. The interactive TV device, moreover, may include appropriate connectors to enable the user to connect external storage devices (whether magnetic or optical, for example), for virtually unlimited space.

Preferably, the compression and decompression of video streams into and from the MPEGx standard is carried out in hardware, thereby enabling a more efficient use of processor resources and encoding and decoding functions that are independent of the current processing load on the internal processor 146 of the circuitry 100. Toward that end, a graphics processing assembly 190 is preferably coupled at least to the AV Bus 138 and to the digital AV bus 138. The graphics processing assembly 190 may include a first graphics engine 192 and a second graphics engine 148. The first graphics engine 192 may include, for example, one or more (MPEGx, for example, where x=1, 2 or 4) video encoders 144 coupled to a Central Processing Unit (CPU) 146, which CPU 146 is coupled to one or more (MPEGx, for example) video decoders 154. For example, the video encoder(s) 144 may incorporate a single-chip solution, such as the CXD1922Q MPEG2 encoder manufactured by Sony Corp., for example. The CPU 146 may be a Pentium class processor (such as a Pentium III or higher), as manufactured by Intel Corporation, for example. The second graphics engine 148 may be closely coupled to the bus 150. A current implementation of the second graphics engine 148 includes the SIS630 Chipset from Silicon Integrated Systems Corporation, which includes, among other features, a 2-D and 3-D graphics accelerator, an IDE controller, a bridge to the bus 150, a DVD accelerator and support for a variety of video streams and display devices. A video controller 156 may be coupled to the bus 150 and to the output mux 168. The video controller 156 is also preferably coupled to the CPU 146 via a bus that is optimized to handle graphics and/or video streams, such as a bus conforming to the AGP specification, for example (AGP, or Advanced Graphics Port, is an interface specification introduced by Intel Corporation to speed up the rendering of complex 3-D computer graphics). The video controller 156 may be selected from among the VGA controllers manufactured by nVidia Corporation, for example. The video controller 156 may take any video and/or graphics signal presented to the output multiplexer 168 and deliver it to the Command Bus 150, where is may be processed and/or stored, such as on the disk storage 166.

A "watchdog" processor 134 may be coupled between the AV bus 138 and the Command bus 150. Coupled between the watchdog processor 134 and the AV Bus 138 is a bus interface 132, which performs all required operations to enable the watchdog processor to access and control the video signal on the AV Bus 138. Similarly, coupled between the watchdog processor 134 and the Command Bus 150 is another bus interface 136, which provides all of the bidirectional bus translator functions necessary for the watchdog processor 134 to access and control the video signal flow on the Command Bus 150, and to enable the watchdog processor 134 to access the memory 164 and/or the disk storage 166. For example, the bus interface 136 may include, for example, the EC210 PCI Bus Master/Target device manufactured by Altera Corporation. The watchdog processor 134 is preferably independent of either the CPU 146 or the DSP 162. The principal function of the watchdog processor 134 is to monitor the state of the present interactive TV device. In particular, the watchdog processor 134, under the control of the watchdog general module 1104 (see FIG. 11) may be configured and programmed to monitor and insure the proper functioning of the present interactive TV device. For example, the watchdog processor 134 may monitor the internal temperature of the device (to optimize the operation of internal fans to conserve energy and reduce the device acoustics, among other reasons) and/or other internal parameters, may detect and manage operating modes (sleep, and/or wake up operating modes, for example), may detect the presence of devices and/or signals, and may monitor the camera (see reference 504 in FIGS. 4 and 5) integrated within the present interactive TV device. The watchdog processor 134 may also carry out control functions such as insuring the continued confidentiality of user passwords, managing user profiles, verifying the authenticity and integrity of installed and currently running programs and provide verification of all devices coupled to the present interactive TV device. The watchdog processor 134 may also perform calculations relative to and monitor the load present on the internal buses within the circuitry 100 (such as the AV Bus 138 and the Command bus 150, for example). The watchdog processor 134 may also generate alarms, in cooperation with various applications, when one of the buses 138 or 150 becomes overloaded. Moreover, the watchdog processor 134 may be configured to discharge or otherwise interrupt a video signal that overloads a given bus. For example, the watchdog processor 134 may exert control over the Command Bus 150. Other functions of the watchdog processor 134 include monitoring the integrity of the operating system and to re-load the operating system of the present interactive TV device (such as the Linux operating system, for example) from the network 510 (see FIG. 5) or directly from a data carrier such as a DVD-ROM or CD-ROM while maintaining user-related parameters.

At least the DVB Bus 128, the output of the encoder(s) 152, the bus 150 and the video controller 156, as shown in FIG. 1, may be coupled to an output mux 168 that is configured to selectively route the signals on the aforementioned buses to a number of outputs collectively shown at 109. The outputs 109 shown in FIG. 1 are but a representative few of the possible outputs of the interactive TV device according to the present invention. These outputs 109 may include a plurality of independent TV outputs 112 (such as four independent TV outputs, for example), a Y/C video out 114 (Y being luminance and C being chrominance—also called S-video), a SCART (Syndicat des Constructeurs d'Appareils Radio et Télévision), used for combined audio and video connections—also known as Euroconnector) output 116, a MUX in return 11, a Universal Serial Bus (USB, IEEE1394) output, an ADSL output 182, an IR I2C compatible output (a two-wire serial bus licensed by Royal Philips Electronics), a DVD-RAM or DVD-Recordable output 186 and, for example, a Modem (such as a 56K modem, for example). Other outputs may be provided to in addition to (or substituted for) the outputs 109 shown in FIG. 1, as those of skill may recognize.

The shaded elements of the block diagram of FIG. 1 may be configured to be modular and removable, and may be includes as part of a removable drawer configured to fit within the present interactive TV device. Other and/or additional electronic modules may be incorporated in the removable drawer, to provide the user with the ability to customize and/or upgrade the capabilities of the present interactive TV device. The removable drawer enables the electrical coupling of selected ones of the electronic modules to the command bus 150, the analog bus 138 and/or the digital bus 128. Such modularity enables the present interactive TV device to resist obsolescence by adapting and incorporating to new technologies as they become available.

Figure 2:
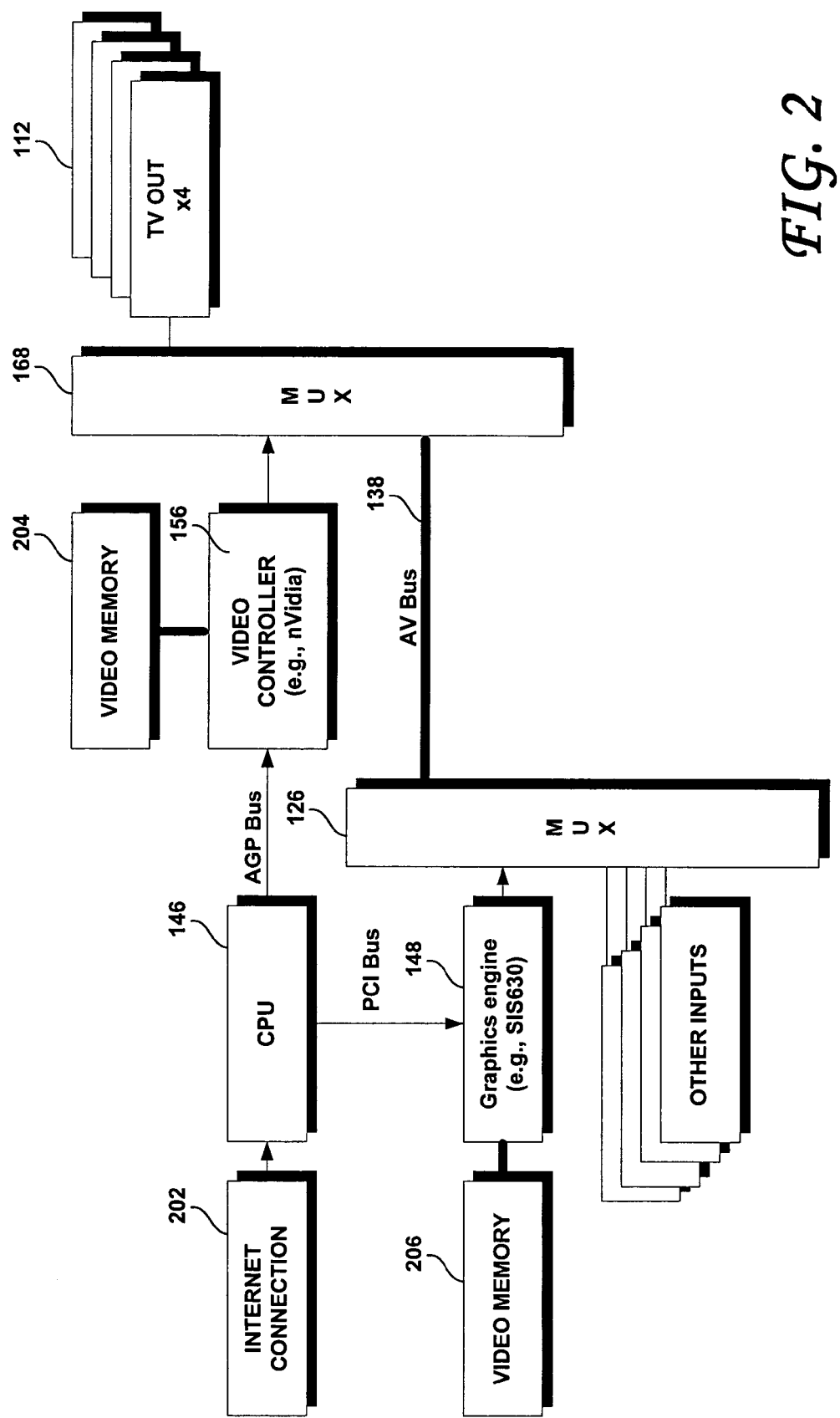
FIG. 2 represents an alternate view of a portion of the block diagram of FIG. 1, to illustrate further aspects of the present invention.

FIG. 2 represents an alternate view of a portion of the block diagram of FIG. 1, to illustrate the manner in which the interactive TV device of the present invention treats an IP connection in a manner that is similar to a television channel—that is, every http address may be seen and treated as a television channel. As shown therein, an Internet (IP) connection 202 is processed by the CPU 146 (and rendered on a display via a Web browser, for example). The output of the CPU 146 may be simultaneously fed to the video controller 156 (a VGA video controller, for example) and to the second graphics engine 148 (such as the previously mentioned SIS630, for example). Both the second graphics engine 148 and the video controller 156 may be coupled to video memory 206 and 204, respectively. The video memories 206 and 204 are not shown in FIG. 1. The stream originating from the Internet connection 202 may be processed by, for example, the second graphics engine 148, output to the output multiplexer 168, fed back to the input multiplexer 126 via the MUX in return 118 and the output MUX 168 and thereafter loaded onto the AV Bus (for example) and processed in the same manner (such as a TV signal) as any other input to the interactive TV device. The present invention, in this manner, may treat all internal data flows as a video or television channel and may be configured to render all such data flows (irrespective of the content, source or format thereof) as a video channel on the display(s) 508, such as shown in FIG. 5.

By providing digital buses 128 (which is uninterrupted from the input to the output of the device) and 150 and one analog bus 138 and two separate and independent processors 146 and 148, a large amount of data may be processed and displayed simultaneously. By providing such high bandwidth and such robust processing power, many of the functionalities once relegated to the content provider may now be carried out internally to the present interactive TV device. For example, the user's choice of programming may now be transparent to the content provider, as the present interactive TV device may simultaneously receive a great deal of information (i.e., multiple data streams) from which the user may select his or her choice of programming and/or content. In effect, the user's choice of content need not influence what content is actually input into the present interactive TV device, thereby insuring the user's privacy. The user, in this manner, may view any content accessed by the device without necessarily informing the content provider of what and when the content is viewed. Moreover, all of the channel settings, device settings, user information and user profiles and preferences may remain confidential and internal to the present interactive TV device and need not be transmitted to an external server for further storage, processing, data mining and possible unwanted targeted marketing.

Figure 3:
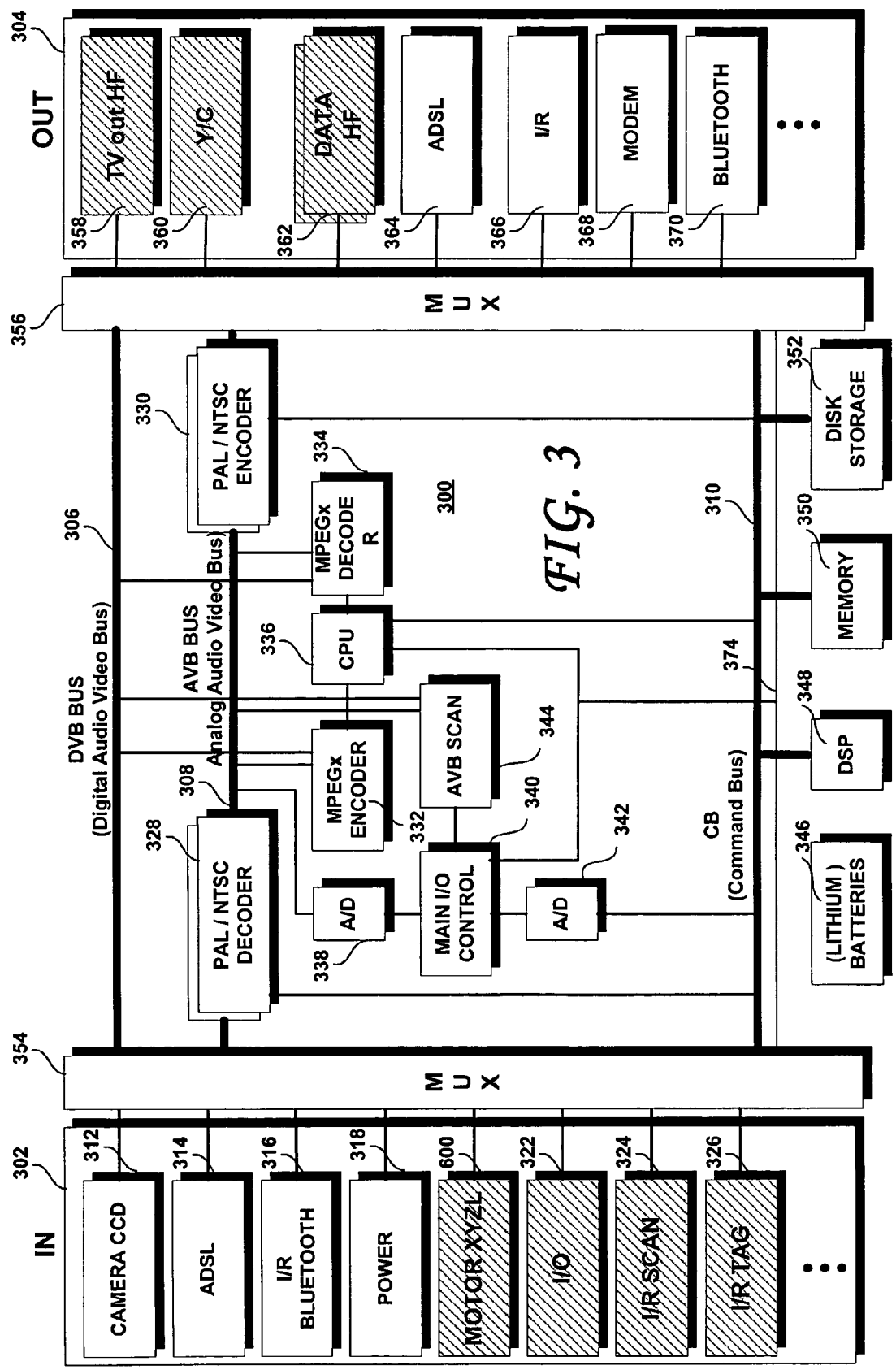
FIG. 3 is a block diagram of the signal processing circuitry of a standalone auto-tracking videoconferencing camera suitable for use alone or in conjunction with the present interactive TV device, according to a further embodiment of the present invention.
Figure 4:
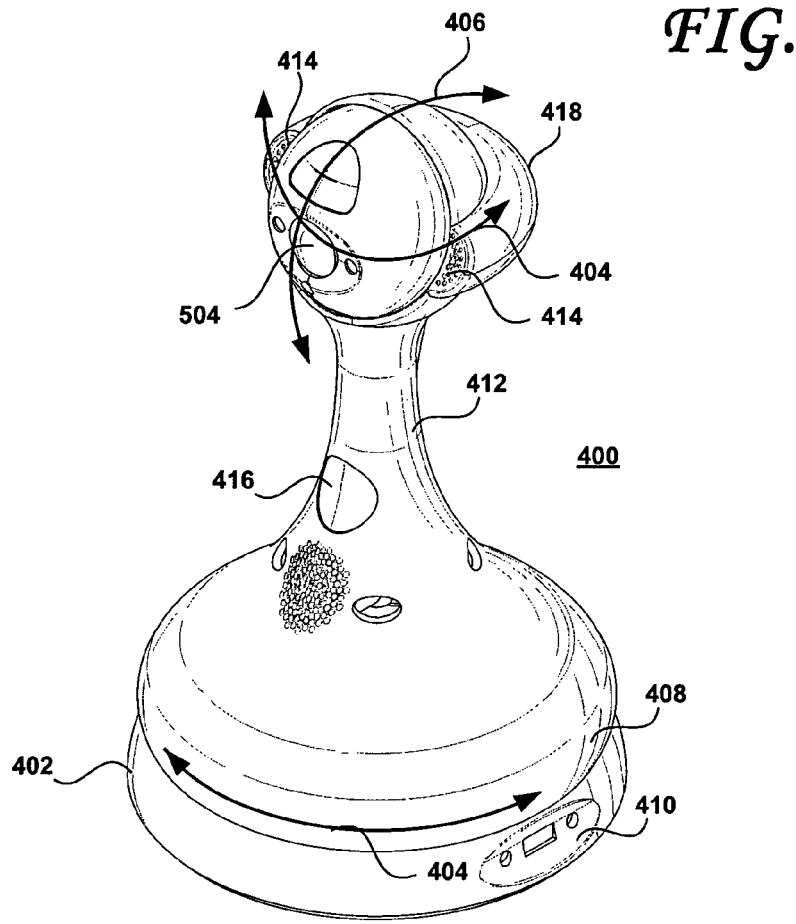
FIG. 4 is a perspective view of a standalone auto-tracking videoconferencing camera suitable for use alone or in conjunction with the interactive TV device of the present invention.
Figure 5:
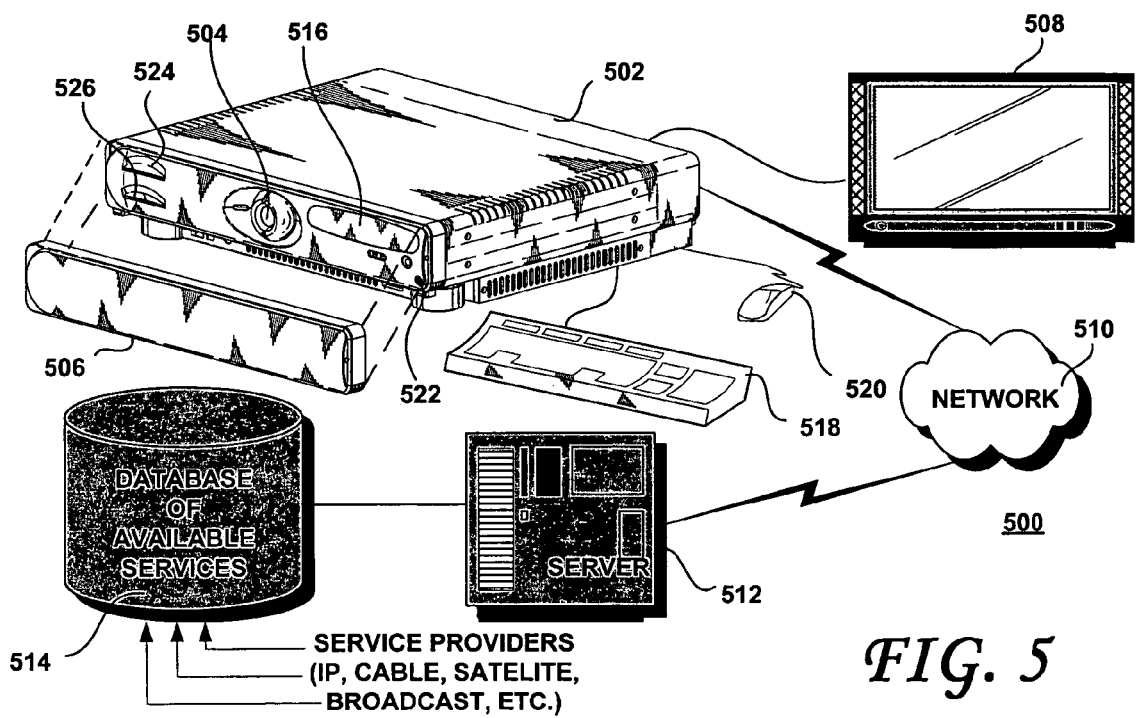
FIG. 5 is a block diagram illustrating the manner in which various sources of information are presented to and acquired by the interactive TV device of the present invention, among other aspects.
Figure 6:
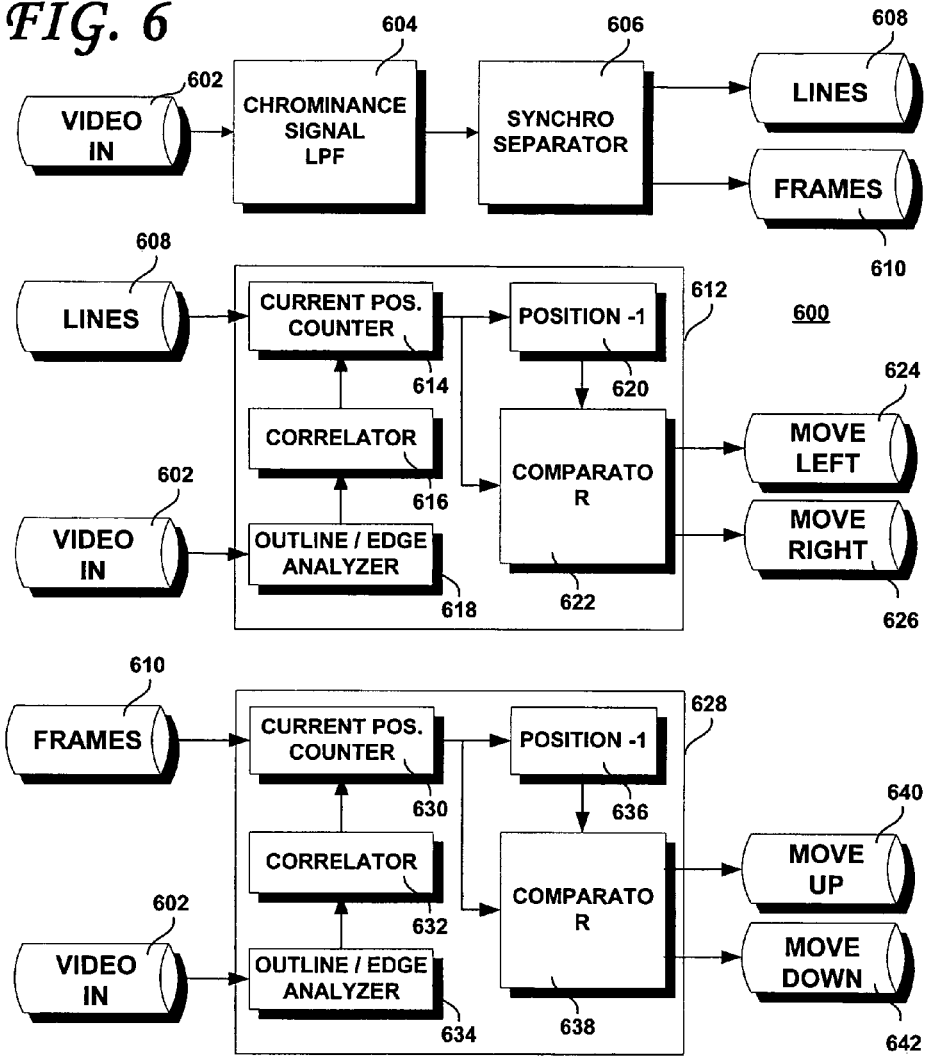
FIG. 6 shows a block diagram of the video signal processing circuitry an analog auto-tracking camera suitable for use in the present invention.

FIG. 3 is a block diagram of the video signal processing circuitry 300 of the auto-tracking videoconferencing camera such as shown at 400 in FIG. 4, according to an embodiment of the present invention. As shown therein, the signal processing circuitry 300 of the present auto-tracking videoconferencing camera 400 is similar to that of the present interactive TV device, in that it is based upon a digital audio video bus (DVB) 306 (uninterrupted between the input 302 and the output 304 of the camera by way of input and output multiplexers 354, 356, an analog audio video bus (AVB) 308 and a command bus 310, such as, for example, a PCI bus. According to the present invention, the AV Bus 308 enables the transport and routing of analog audio and/or video streams from analog sources at the input 302 to analog outputs at the output 304. The DVB bus 306 enables the transport and routing of digital audio and/or video streams from digital sources at the input 302 to digital outputs at the output 304. The CB bus 310 is the camera's internal bus, handing I/O operations, for example, to the different elements coupled thereto such as, for example, memory 350, DSP 348 and/or disk storage 352 (via an IDE bus, for example). The CB bus 310 may include a PCI bus, an I2C bus, an IDE bus, a USB bus and/or and IEEE 1394 bus, to name a few illustrative (but not limiting) examples. The analog bus 308 may include one or more video decoder and encoder combinations, as shown at 328 and 330. For example, the decoder(s) 328 may include a PAL/NTSC and/or SECAM decoder(s), whereas the encoder(s) 330 may likewise include a PAL/NTSC and/or SECAM encoder(s), to provide an encoded video stream to the output mux 356. An MPEGx (where x=2 or 4, for example) encoder takes the decoded output of decoder 328 or the digital video stream transported on the digital AV bus 308 and generates an MPEGx encoded output to a CPU 336, which may be or include a Pentium-class processor, for example. The CPU 336 may also be coupled to one or more MPEGx decoders, which may also be coupled to the analog and digital buses 308, 306. The output of the CPU 336 may also be provided to the Command Bus 310. Both the decoder(s) 328 and the encoder(s) 330 may also be coupled to the Command Bus 310. A Main Input/Output control processor 340, together with AVB Scan 344 monitor and regulate the traffic on the three buses 306, 308 and 310. Indeed, the AVB Scan 344 functions as an automatic traffic regulator by informing the Main I/O control processor 340 of the current bandwidth transported on each of the busses 306, 308 and 310, thereby enabling the Main I/O control processor 340 to balance the bandwidths on each of the busses 306, 308 and 310. An analog to digital converter 338 takes the decoded analog output of the decoder 328 and feeds it to the Main I/O Control processor 340. Similarly, the output of the main I/O control processor 340 may be converted to digital form by the analog to digital converter 342 and output onto the Command Bus 310. The CPU 336 may also be coupled to the main I/O control processor 340. The output multiplexer 356 may be directly coupled to the input mux 354 by Mux Return Path 374. The input 302, according to the present invention, may include the output of a camera CCD 312, an ADSL input 314 (and/or other broadband network connection), an IR (conforming, for example, to the IrDA protocol set out a www.irda.org) and/or Blue Tooth input 316 (and/or an output supporting an equivalent wireless short or long range communication protocol) and/or an external power jack 318. An internal source of power (such as internal lithium batteries 346) may also be provided. An auto-tracking analog controller 600 (as shown in FIG. 6), an I/O port 322, an IR Scanner 324 and an IR tag input 326 may also be present at the input of the circuit. Other inputs may be added and/or substituted to the present invention, without, however, departing from the scope of the present invention, as those of skill in this art may realize. The output 304 may include one or more HF TV outputs 358, one or more Y/C (S-Video) outputs 360 one or more HF data outputs 362 (coupled through the CB Bus 310, for example), and ADSL (and/or other broadband network connection), an IR output 366, a modem (such as a 56K modem, for example) 368 and a Blue Tooth-compatible output 370 (and/or an output supporting an equivalent wireless short or long range communication protocol). The shaded elements 320, 322, 324, 326, 358, 360 and/or 362 may be made removable and disposed, for example, in one or more of the rings 408 shown in FIG. 4). This enables the video processing circuitry 300 to be readily updated with removable elements that couple with the three internal buses 306, 308 and/or 310.

FIG. 4 is a perspective view of a standalone auto-tracking videoconferencing camera 400 suitable for use in conjunction with the interactive TV device 502 of the present invention. The ornamental features of the videoconferencing camera 400 are disclosed in commonly assigned and co-pending U.S. design patent application Ser. No. 29/132,500 and entitled "Videoconferencing Tracking Camera" filed on Nov. 9, 2000, the disclosure of which is incorporated herein in its entirety. The auto-tracking camera 400, according to the embodiment illustrated in FIG. 4, includes a base 402 (shown as circular in FIG. 4), onto which one or more rings 408 may be stacked (one such ring being shown in FIG. 4). The base 402 may include a connector 410 for power, video signal and/or control signals (such as the signals shown at 624, 626, 640 and 642 in FIG. 6). The ring or rings 408 may discharge various functions. For example, one ring 408 may include a battery to provide for up to three hours (for example) of autonomy for the standalone camera 400. Another ring 408 may include a controller coupled to an electric motor for rotating the base 402 of the camera 400 along the X-axis 404. A third ring 408 may include HF communication means and means for processing an analog and/or digital video stream, as detailed relative to FIG. 3. Additional rings 408 may be provided to support, for example, the Blue Tooth short range wireless specification. Such additional rings 408 may also support ADSL, may include a processor (from Intel Corporation, for example) to run a multipoint videoconferencing application under, for example, the Linux operating system. Over the ring(s) 408, the body portion 412 may incorporate an infrared (IR) sensor 416 and various (internal or external) antennas to enable the various modes of communication. The body portion 412 supports a head 418 that includes the optics of the camera 504, motors for moving the camera 504 along the X and Y-axes 404, 406 and stereo microphones 414. The optics (manufactured by Canon, for example), according to an embodiment of the videoconferencing camera 400, may advantageously be configured with auto focus, zoom (a 4:1 zoom, for example) and diaphragm functionalities that enable the videoconferencing camera 400 to select and center a target such as a person within a rectangular space of 1 m$^2$ from a distance of 1 meter or to center a person in a rectangular space of 1.5 m$^2$ from a distance of 5 meters. The videoconferencing camera 504 includes circuitry for creating an analog video stream and/or a digital video stream (audio+video), as detailed relative to the block diagram of FIG. 3. Preferably, a Charge Coupled Device (CCD) imaging device within the camera 504 operates at less than 2 Lux to generate a High Definition TV-quality video stream.

FIG. 5 is a block diagram illustrating a system 500 for interactive television and the manner in which various sources of information are presented to and acquired by the interactive TV device 502 of the present invention. As shown therein, the system 500 includes the interactive TV device 502 coupled to a television or display 508. A keyboard 518 may be removably coupled to the present interactive TV device 502, as may be a pointing or input device, such as mouse 520. The ornamental features of the interactive television device 502 are further disclosed in commonly assigned and co-pending U.S. design patent application No. 29/132,949 entitled "Set-Top Box with Embedded Tracking Video Camera" filed on Nov. 16, 2000, the disclosure of which is incorporated herein by reference in its entirety. The interactive TV device 502 may include an integrated disk reader and/or recorder 516, such as a CD-ROM or DVD player/recorder (such as, for example, a DVD-R, DVD-RW or DVD-RAM, for example), as well as a smart card reader 526 and/or a magnetic card reader 524 to enable users to insert and/or swipe credit, charge or debit cards within the device 502 to purchase goods and services online. The interactive TV device 502 may also include an integrated camera 504, which is able to pan along both the X axis 404 and the Y axis 406 and to automatically track a target such as a speaker without resorting to analog to digital (A/D) and digital to analog (D/A) conversions and digital processing techniques, as explained relative to FIGS. 6 and 7. The device 502 may also include one or more microphones, such as shown at 522. To insure privacy when videoconferencing is not desired, a cover 506 may be fitted over the front face of the interactive TV device 502 to physically obscure the field of view of the camera 504 by placing a physical opaque barrier over the optics of the camera 504. A similar cover may be configured to fit over the optics of the standalone video camera 400 of FIG. 4.

According to the present invention, the interactive TV device 502 may also be coupled, via a network 510, to one or more servers 512. The server 512, in turn, may be coupled to a database 514. The database 514 may store information as to the availability of communications services, content providers and the like. Specifically, the database 514 may include records for Internet Service Providers (ISP), cable television providers, satellite broadcast providers and records of all content providers that may be accessible and usable to the interactive TV device 502. According to one embodiment of the present invention, the interactive TV, upon initialization or periodically, may query the database 514 to determine what services are available to it and report to the user. Such a query (carried out by the localization general module 1102 shown at in FIG. 11) may provide the server 512 with the telephone area code of the location in which the interactive TV device 502 is deployed, whereupon the server 512 may retrieve the records of all service providers that provide services within that area code and return the information to the interactive TV device 502 to be displayed on the television or display 508 for the user. The user may then pick and choose which services he or she wishes to access or subscribe to. Alternatively, the interactive TV device 502 may provide the server 512 with the current time of day and the time zone of the location in which the device 502 is deployed. Alternatively still, other localization indicium or indicia may be provided to the server 512 to enable the server to appropriately formulate a query (such as a Structured Query Language (SQL) query, for example) to the database 514 to retrieve therefrom a list of available services. The interactive TV device 502 may also receive positioning signals (for example, from the Global Positioning Satellite (GPS) or GLONASS systems, for example) to fix its geographical coordinates, for example, to pinpoint its geographic location without any input form the user. This localization may be carried out completely anonymously or with a selectable degree of anonymity. The network 510 may include the Internet, a dedicated broadband connection, satellite and/or cable, ADSL or most any other communication channel between the device 502 and the server 512.

Figure 7:
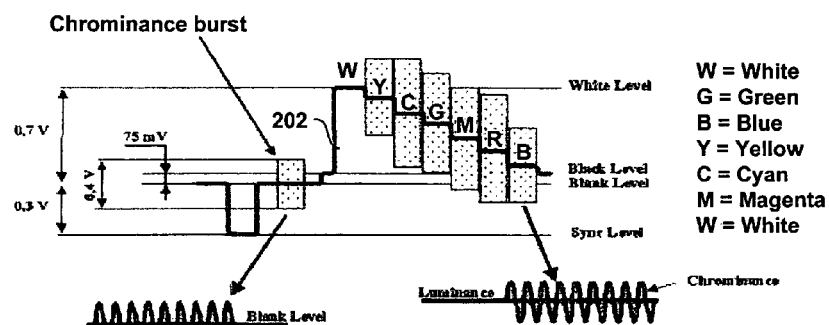
FIG. 7 illustrates a videocomposite signal.

As is known, a video frame is composed of a series of successive scan lines that start at the top of the picture frame, after the generation of a frame pulse. The frame pulse enables the synchronization of the offset of the scan lines from the top to the bottom of the picture frame, to precisely interlace two scanning fields of such scan lines. Each line starts from the left hand side of the picture frame after the top line signal. Each line is traced between 50 and 65 µs and a frame lasts between 16 to 20 ms, depending upon the prevailing video standard. FIG. 7 illustrates a videocomposite signal. The initial negative pulse (shown in FIG. 7 as a 0.3 V amplitude square wave) represents the line synchronization that is immediately followed by a blank level and a black level. It is from this black reference level that any rise in voltage corresponds to a lighter image until a maximum white level is reached. Frequency bursts are then superimposed upon this luminance signal to deliver the chrominance information of the videocomposite signal.

FIG. 6 shows a block diagram of an auto-tracking analog controller 600 suitable for controlling the camera of the interactive TV box of the present invention. The controller 600 enables the camera to automatically track and remain centered on a target (such as a person or a speaker in a conference room or a person in his or her living room watching TV) within a room along both the horizontal (X) and vertical axes (Y). According to the present invention, the camera 504 may be initially and grossly pointed to the target (e.g., person) by locating a selected and coded infrared signal emitted by an electronic badge or tag (shown in FIG. 13 at reference 1310) carried on the person. The electronic badge 1310 may include a selectively activated infrared transmitter configured to generate an IR signal that may be received by the IR sensor 416 or by an IR sensor on the interactive TV device 502. Both the interactive TV device 502 and the electronic badge may also include one or more microphones. Thereafter, the auto-tracking controller 600 of FIG. 6 will keep the person centered within the field of view of the camera 504. Alternatively, the gross framing of the person using the electronic badge 1310 may be omitted.

The input signal 602 represents a videocomposite signal, as shown in FIG. 7. As the analog auto-tracking system of the present invention does not use the chrominance information, it may be filtered out, as shown at 604. The lines and a frames signals may then be separated by the synchro separator 606 and fed to separate outputs, labeled lines 608 and frames 160. It is the lines and frames signals 608, 610 that control the displacement of the camera 504 of the interactive TV device and of the camera 504 of the standalone analog auto-tracking camera 400 of the present invention, together with the videocomposite signal 602. As shown in FIG. 6, the auto-tracking analog controller 600 includes a horizontal displacement controller 612 that generates a move left signal 624 and a move right signal 626 and a vertical displacement controller 628 that generates a move up signal 640 and a move down signal 642. Together, the move left signal 624, the move right signal 626, the move up signal 640 and the move down signal 642 fully control the displacement of the camera 504 of the interactive TV device and of the standalone auto-tracking camera 400 of the present invention. As shown in FIG. 6, the inputs to the horizontal displacement controller 612 include the video in signal 602 and the lines signal 608. The lines signal 608 may be input into a current position counter 614, which counts the lines of the video signal 602. The video in signal 602 may be input into an outline analyzer 618. An outline (of a speaker, for example) may be determined, according to the present invention, by a transition in the amplitude of the luminance signal. This outline may be extracted from the video in signal 602 by an analysis of the derivative of the luminance signal. To avoid errors in the outline analyses due to, for example, an alternating high contrast pattern on the speaker's clothing, the output of the outline analyzer 618 may be fed into a correlator 616, which calculates the total energy of the signal and the position of the speaker by correlation. The output of the correlator 616 may also be input to the position counter 664, which assigns a number to the current position of the speaker. The output of the current position counter 614 may also be latched into the position-1 module, which may be configured to store a value representative of the previous position of the speaker. Indeed, as the target person moves, the output of the current position counter 614 is a value that corresponds to the speaker's current position, whereas the position-1 module 620 holds a value representative of the target person's previous position. By comparing the value within the position counter 664 with the value stored within the position-1 module 620 in a comparator 622, it is possible to generate move left and move right signals 624, 626 to control the movement of the camera 504 along the X-axis. Indeed, the camera 504 may be controlled to move to the left if the value representative of the previous position is greater than the value representative of the current position of the target person. Similarly, the camera 504 may be controlled to move to the right if the value representative of the previous position is less than the value representative of the current position of the target person.

The lines pulses 608 initialize the position analysis at the top left corner of the picture frame (the position of the scanning spot after the blanking interval). Each scan line of a frame may then be tested to determine the degree to which the target person may have moved in the horizontal direction. The test includes a determination of the outline of the target person from the envelope of the luminance signal corresponding to the person. Once the outline of the person has been determined, it is only necessary then to determine its offset relative to the line synchronization pulse to calculate the direction of the displacement of the person. Indeed, if the offset between the top synchronization pulse and the beginning of the outline of the person is getting smaller, the person is moving toward the left and the move left output signal 624 may be asserted. In contrast, if the offset between the top synchronization pulse and the beginning of the person is getting larger, the speaker is moving toward the right side of the picture frame and the move right output signal 626 may be asserted. These signals 624, 626 may be fed to the camera motor control system in real time to close the control loop and cause the camera 504 to follow the target person as he or she moves left or right.

Turning now to vertical control, the frames signal 610 and the video in signal 602 are input to the vertical displacement controller 628, which has a structure that is similar to that of the horizontal displacement controller 612. The vertical displacement controller 628 outputs the move up signal 640 and the move down signal 642, which signals are then fed in real time to the camera motor control system to close the control loop and cause the camera 504 to follow the target person as he or she moves up or down. Indeed, if the offset between the top frame and the beginning of the outline as determined by the outline analyzer 634 and the correlator 632 diminishes, the person is moving up and if the offset increases, the person is moving down. This offset is determined by the difference between the current and the previous position of the person, as fed to the comparator 638 by the current position counter 630 and the position-1 module 636.

Figure 13:
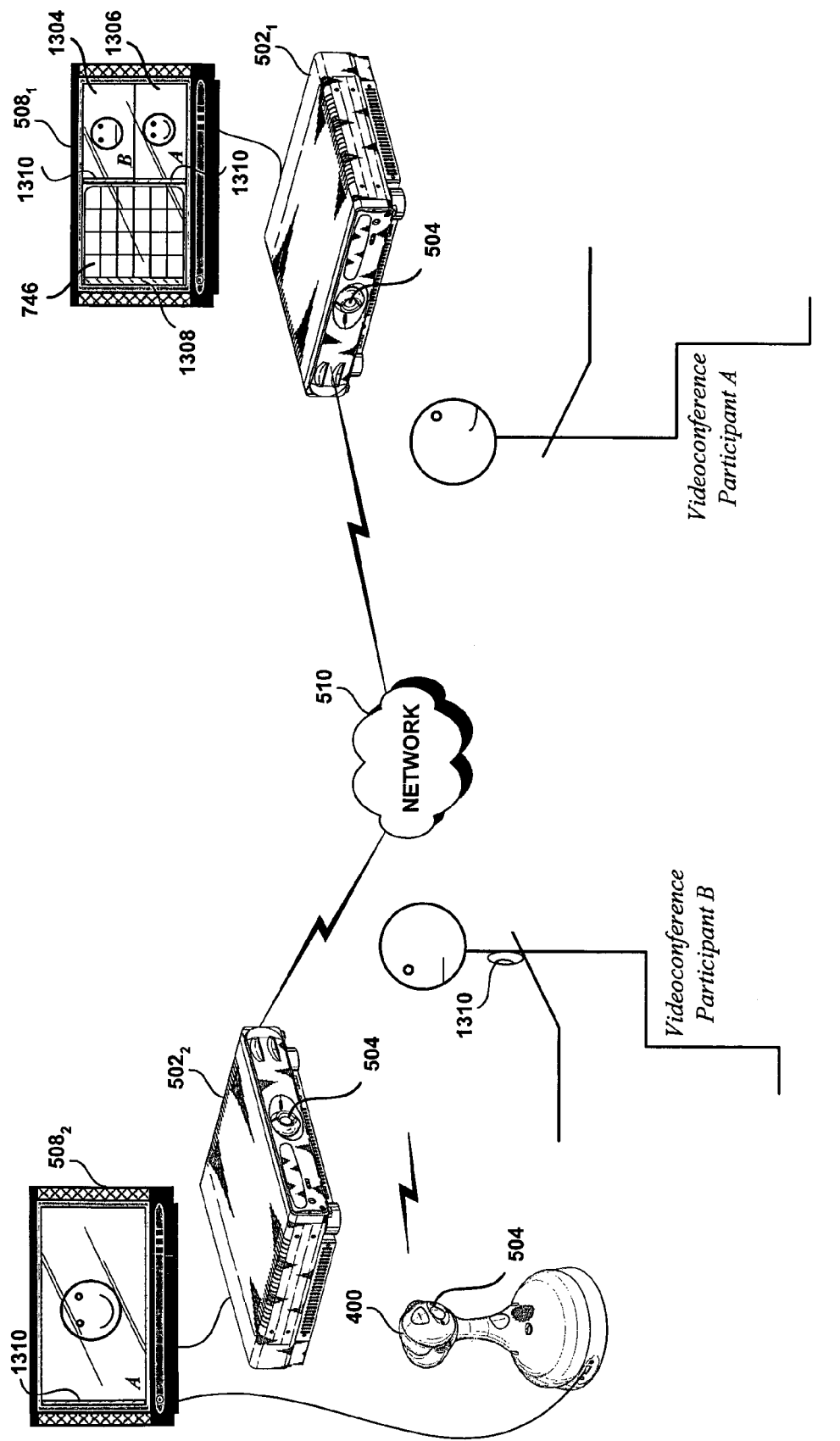
FIG. 13 shows an example of a videoconference utilizing the present interactive TV device and/or the present auto-tracking videoconferencing camera, according to the present invention.

FIG. 8 shows an embodiment of the user interface of an interactive TV device, according to an embodiment of the present invention. As shown therein, the display 802 of a television (or other display) 508 may be used in full screen mode or may be used in a configuration that includes one or more quarter screen segments 802a, 802b, 802c and 802d, as shown. Each of the quarter screen segments 802a, 802b, 803c or 803d may display, for example, any combination of TV channels through one or more of the four independent television tuners (see reference numerals 112 in FIG. 1) of the interactive TV device of the present invention. Alternatively, the four quarter screen segments 802a, 802b, 803c and 803d may simultaneously display a combination of differently formatted video streams from a variety of providers. As shown in the illustrative example of FIG. 8, one of the quarter screens segments 802a, 802b, 803c and 803d may show a letterboxed movie as shown at 802b, another quarter screen 802b may display a videoconference between users of like interactive TV devices and/or standalone auto-tracking videoconferencing cameras 400 (as shown in FIGS. 4 and 13) as suggested by 802b, another quarter screen may display a broadcast TV channel such as shown at 802c (a weather channel, for example) while yet another quarter screen may display a fully functional Web browser and a Web site rendered by a browser application loaded onto the device 502, as shown at 802d.

The user interface of the interactive TV device of the present invention provides for a pull out strip 804, 806, 808 and 810 along each side of the display 802. Such pull out strips may be normally invisible to the user during normal viewing. However, when pulled out by a pointing device (such as mouse 520 shown in FIG. 5) or another input device (including the user's voice, for example), the pull out strips 804, 806, 808 and 810 extend toward the opposite side of the display 802 from which they emerged to allow the user to fully control and program the operation of the present interactive TV device 502. The pull out strips 804, 806, 808 and 810 are shown in the configuration of FIG. 8 only to avoid obscuring the display 806 with overlapping strips. The pull out strips 804, 806, 808 and 810 may each include a plurality of icons 812, represented in FIG. 8 by the constituent squares making up each of the pull out strips 804, 806, 808 and 810. Each of the icons 812, when clicked on by a pointing device 520 or selected by some other input device (including voice) may launch some application, provide the user with further choices and/or carry out some predetermined action or function. The icons 812 may be grouped according to functional categories. That is, icons 812 in each of the pull out strips 804, 806, 808 and 810 may be functionally related. As shown in FIG. 8, the pull out strip 804 may reveal icons and/or information related to communications, the pull out strip 806 may reveal icons and/or information related to events management (recording of televised events, for example) and configuration and current state of the interactive TV device 502, pull out strip 808 may reveal icons and/or information related to user and profile management functions (creation, modification, deletion of users and user profiles and the access rights associated therewith) and pull out strip 810 may reveal icons and/or information related to available channels, including broadcast TV, cable TV, satellite TV and/or Web (Internet) channels, for example), resource (e.g., DVD) channel, camera channels or any video stream—from an auxiliary input, for example. Other functional assignments and distributions to the pull out strips 804, 806, 808 and 810 may be made, as those of skill in this art will readily recognize. The pull out strips 804, 806, 808 and 810 may be programmable, configurable and customizable. Not all pull out strips 804, 806, 808 and 810 need reveal the same number of icons, nor must all icons be of the same size. Some icons may include logos, such as the logos of corporate broadcasters or personalized logos of users of the present invention (see, for example, FIGS. 9 and 10). When selecting a pull out strip 804, 806, 808 or 810, the user may cause at least a portion of the display 802 to be at least partially obscured until the pull out strip 804, 806, 808 or 810 is released and collapses into the side of the display 802 or otherwise disappears from the display 802 and the user's view.

Figure 9:
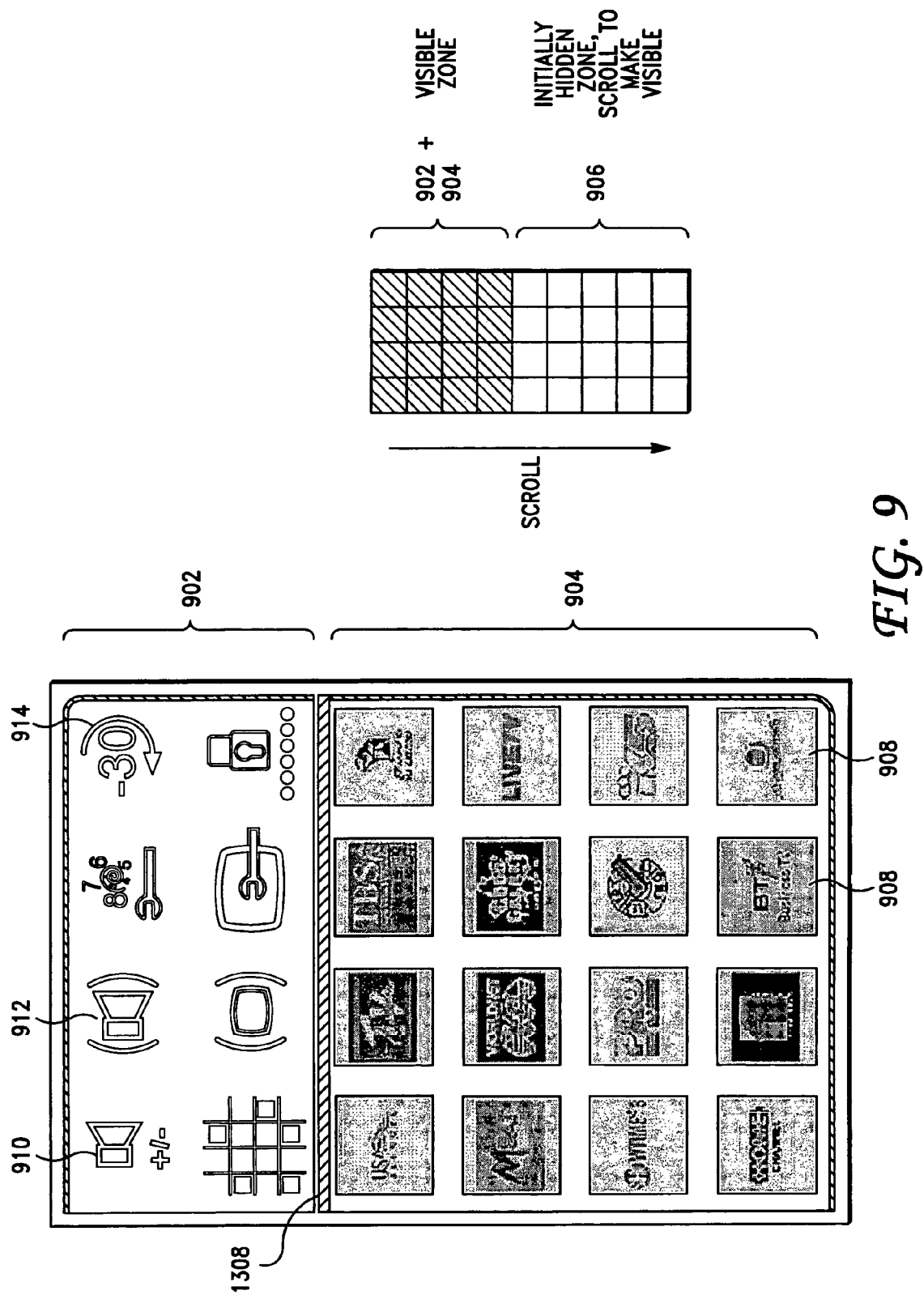
FIG. 9 shows an example of a pull out strip, according to an embodiment of the present invention.

FIG. 9 shows an example of a pull out strip, according to an embodiment of the present invention. Such a pull out strip, as shown in FIG. 9, may be configured as above-mentioned pull out strip 810, and may reveal icons and/or information related to available channels (broadcast TV, cable TV, satellite TV, Web (Internet) channels, resource (e.g., DVD) channel, camera channels or any video stream—from an auxiliary input, for example). As shown the pull out strip may be divided into a first section 902 and a second section 904. As shown, the section 902 may include icons, such as shown at 910, 912 or 914. These icons may be selected to configure the present interactive TV device or to otherwise carry out some predefined function. For example, the icon 910 may be selected by the user to adjust the volume, icon 912 to mute the volume and icon 914 may cause playback to resume at a point that is 30 minutes backward in time from the point in the playback. Other icons may be related to the position of icons and/or logos on the pull out strip, blanking the display (for privacy, for example), adjusting the display characteristics and/or locking a display and/or channel, for example. The second section 904 may include a plurality of logos 908. Each logo may be selected by the user and may cause the display of the current program on the corresponding TV channel. The user may personalize logos and/or create entirely new logos for existing channels and/or services. According to an embodiment of the present invention, the pull out strips may include a zone that is visible when the strip is pulled out and an initially hidden zone 906 that is made visible when the user scrolls the strip. In this manner, an unlimited number of icons and/or logos may be represented in any of the pull out strips 804, 806, 808 or 810.

Figure 10:
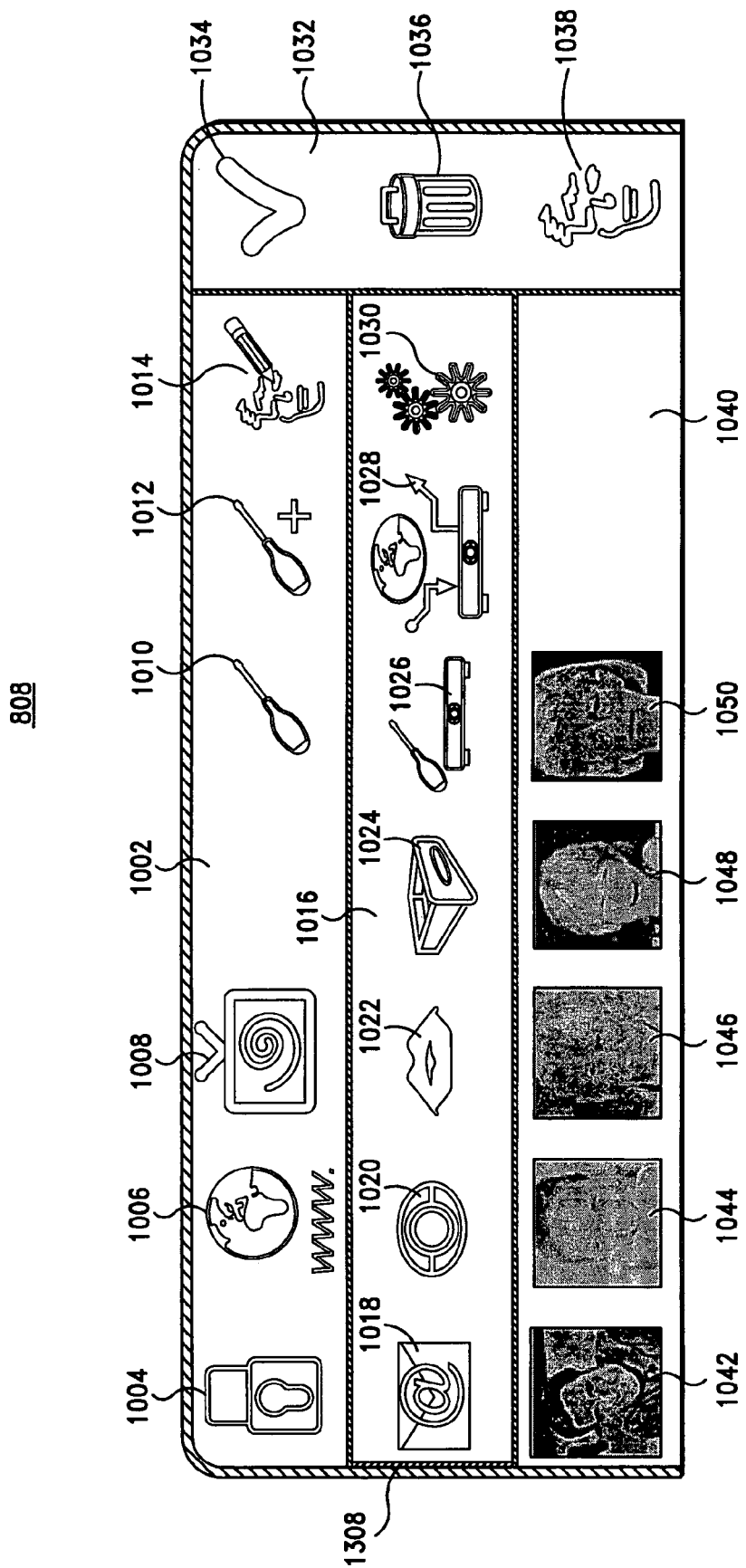
FIG. 10 shows an example of a pull out strip configured to manage users and user profiles, according to an embodiment of the present invention.

FIG. 10 shows an example of a pull out strip configured to manage users and user profiles, according to an embodiment of the present invention. Such a pull out strip may reveal icons and/or information related to user and profile management functions (creation, modification, deletion of users and user profiles and the access rights associated therewith), as discussed relative to pull out strip 808 above. Such a pull out strip 808 may include one or more icon sections 1002, 1016 and 1032 and one or more logo sections 1040. Logos 1042 through 1050 show a picture of the users currently configured on the present interactive TV device. Each such user may log onto the present interactive TV device and individually define the configuration for the present interactive TV device (although choices may be deliberately restricted for some users, such as minors). This enables each user to personalize the device to their own liking and to enable parents to control the actions that their children (such as represented by logos 1048 and 1050) may take. For example, parents 1042 and/or 1044 may lock out certain features of the device to their children 1048, 1050 (such as the videoconferencing feature, for example) and/or lock out certain channels.

The icon 1004 of the icon section 1002 enables the currently logged on user to define their preferred security options, icon 1006 enables the currently logged on user to configure their IP connection, icon 1008 enables the user to configure broadcast and/or satellite TV channels, icon 1010 enables the user to set basic configuration features of the present device, icon 1012 enables the user to set advanced configuration features and icon 1014 enables the presently logged on user to edit their user profile. Icon section 1016 includes an icon 1018 for configuring e-mail, an icon 1020 for configuring the videoconferencing settings, icon 1022 for configuring chat settings, an icon 1024 for configuring the removable drawer (see FIG. 1 hatched items), an icon 1026 for configuring the states of the present interactive TV device, an icon 1028 for network configuration settings, and an icon 1030 for configuring applications running and/or loaded on the present interactive TV device. Another icon section 1032 may include a validation icon 1034, a delete icon 1036 and a new user icon 1038. The above-described icons are only exemplary in nature and those of skill in this art will realize that other icons or means of invoking the associated actions and/or functions are possible within the context of the present invention. A colored strip 1308 may be used to indicate to the user whether the various settings addressed by the icons are properly configured. The colored strip 1308 may, for example, be colored green if the settings are properly configured and may be colored red if one or more of the settings are not properly configured. Alternatively, the color of the strip 1308 may indicate whether horizontal scrolling is available in icon section 1016 (e.g., to reveal additional icons). Indeed, if the strip 1308 is a neutral color, no horizontal scrolling may be available (e.g., all icons are displayed in the icon section 1016 without the need to scroll), if the strip 1308 is green, left horizontal scrolling may be available to reveal other icons and if the strip 1308 is red, no further left horizontal scrolling may be available.

By utilizing pull out strips, icons, logos, colored strips and scrolling such as described relative to FIGS. 8, 9 and 10, a very intuitive, functional and compact user interface is created that may be controlled with a user-operated remote control unit that is provided with as few as three buttons and/or a trackball. A suitable remote control for the present invention is disclosed in commonly assigned and co-pending U.S. Design patent application Ser. No. 29/141,046 filed on Apr. 27, 2001 and entitled "Remote Control", the disclosure of which is incorporated herein in its entirety.

Software Architecture

Figure 11:
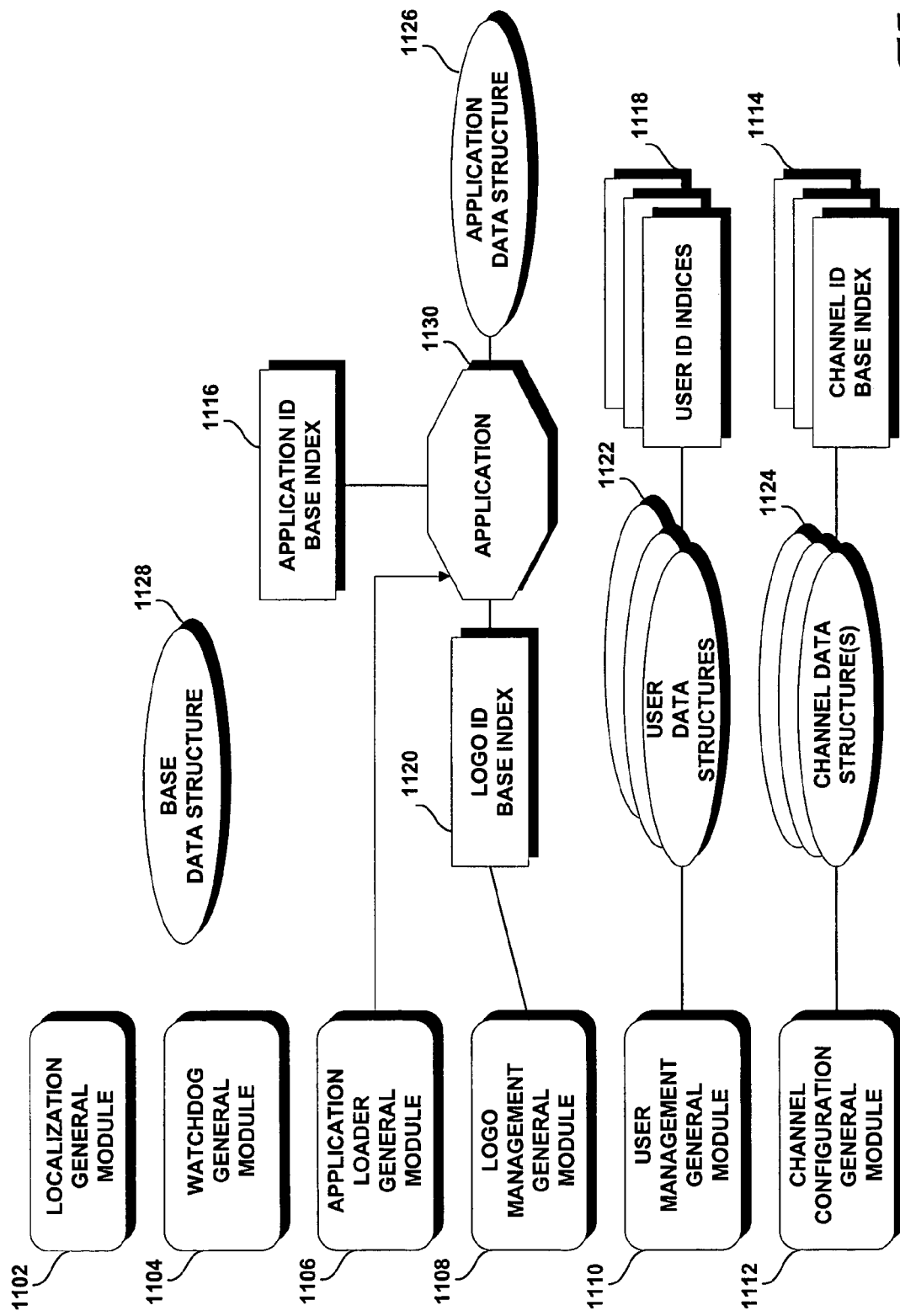
FIG. 11 is a functional block diagram showing the main elements of the controlling software of the present interactive TV device.

The present interactive TV device may be controlled by software that is preferably modular in design, in that the functions of the device are controlled by a plurality of software modules that may be dependent upon one another or independent of other modules. The control software may be loosely categorized in two groups; namely a first group that includes general modules and a second group that includes applications, of which the "Home" application is detailed below. The general modules are preferably independent of the applications, but provide for the requirements of existing and future applications, as well as the requirements of future hardware devices. The general modules are preferably designed so as to maximize the re-use thereof under an open source operating system, such as Linux. As shown in FIG. 11, the general modules include the localization general module 1102, the watchdog general module 1104, the application loader general module 1106, the logo management general module 1108, the user management general module 1110 and the channel configuration general module 1112.

Localization General Module

As detailed relative to FIG. 5, the localization general module 1102 enables the present interactive TV device to localize itself geographically (and, by extension, within the landscape of locally available service and content providers). This may be carried out by supplying some information such as telephone area code, time of day and time zone and the like to a server, such as shown at 512 in FIG. 5. The server 512 may then query a database or databases 514 to obtain therefrom information related to all locally available services and content providers, which may then supplied to the present interactive TV device to initialize local values such as, for example, the URL of the relevant TV program listing server.

Watchdog General Module

The watchdog general module 1104 may be loaded onto the watchdog processor (shown at reference 134 in FIG. 1) to continually monitor the proper functioning and integrity of the present interactive TV device. The watchdog general module 1104 may be configured to monitor some or all of the internal electronics and to signal any malfunction. The watchdog general module 1104 may also be configured to monitor and the integrity of the installed software and to re-generate, if necessary any software from an installation data carrier (e.g., CD ROM or DVD) while conserving any existing parameters (user parameters and profiles, logos, channel parameters, etc.). This module 1104 may also monitor the internal temperature of the interactive TV device (to optimize the operation of internal fans to conserve energy and reduce the device acoustics, among other reasons) and internal parameters, to detect and manage operating modes (sleep, and/or wake up operating modes, for example), to detect the presence of devices and/or signals, and to manage the camera 504 integrated within the present interactive TV device. The watchdog general module 1104 may also carry out control functions, to insure the continued confidentiality of user passwords and manage user profiles, for example. The watchdog general module 1104 may also monitor the load present on the internals buses within the interactive TV device (such as the AV Bus 138 and the Command bus 150 shown in FIG. 1, for example). The watchdog general module 1104 may also generate alarms, in cooperation with various applications, when one of the buses 138, 150 becomes overloaded. Moreover, the watchdog general module 1104 and the processor 134 may discharge or otherwise interrupt a video signal that overloads a given bus.

Application Loader General Module

The application loader general module 1106 may be configured to load applications or other software modules onto the present interactive TV device by installing the application or software module from a local data carrier (such as a DVD loaded into the integrated disk reader and/or recorder 516— see FIG. 5) and/or by downloading the application or software module from a server coupled to a network (such as shown at 510 in FIG. 5). The loading of an application or software module may be carried out in two phases. The first phase may include the loading and installation proper of the application or software module and the second phase may include a configuration and parameterization of the installed application and/or software module from the system data structures, discussed hereunder.

Logo Management General Module

The logo management general module 1108 enables the clipping of a logo from a Web site, the creation of an altogether new logo as well as the modification or deletion of an existing logo. This module, therefore, allows different users to create their own personal set of logos and to create their own personalized logos. Upon the creation of a new or modified logo, the logo management general module 1108 may automatically format the new or modified logo for use by the different applications. The logos may be stored as small graphic files and stored in a standard graphic format, such as the bitmapped GIF format. FIG. 9 shows examples of logos 908 that may have been clipped (cut, pasted and formatted) from a corporate Web site, using the logo management general module 1108.

User Management General Module

Figure 12:
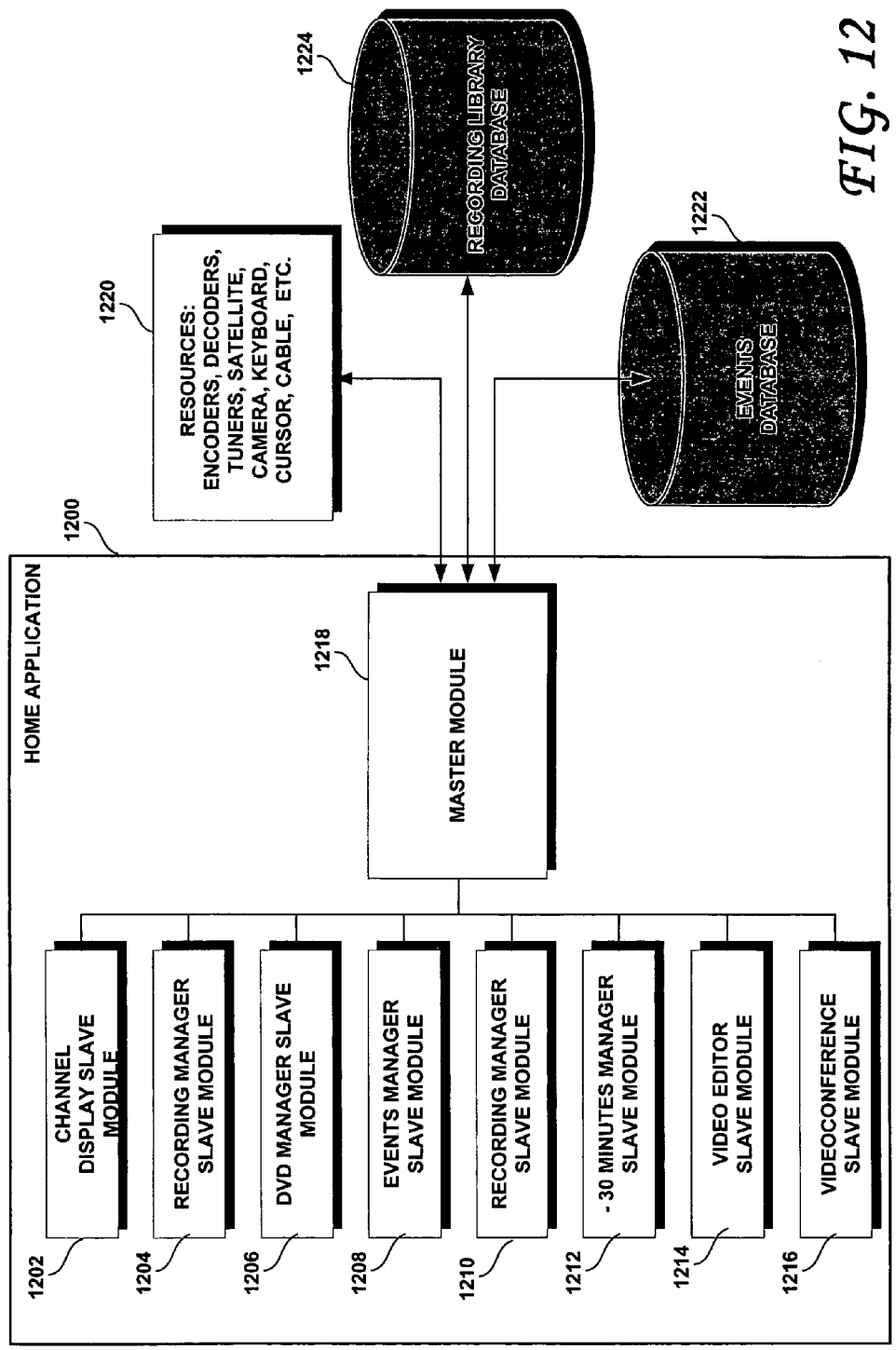
FIG. 12 is a functional block diagram of the "Home" application that is configured to manage many of the functions of the present interactive TV device, according to further aspects of the present invention.

A user management general module 1110 loaded on the present interactive TV device enables the creation, modification and deletion of users and user profiles. According to the present invention, each user of the interactive TV device may be identified within the device by a unique user identification number (User ID). This user ID may be exclusively internal to the interactive TV device and may not be known to the user. According to an embodiment of the present invention, users may access their profile or profiles and/or login to the present interactive TV device by selecting their picture 1042, 1044, 1046, 1048 or 1050 (alternatively, some other personalized graphic) from among the pictures of other users of the device, as shown in FIG. 12. Each of the user logos is associated with a unique user ID. Each user may be represented within the device by a distinctive logo (their picture, for example), in the same manner as a TV channel is represented by its own distinctive logo. According to an embodiment of the present invention, a user profile may be defined by and/or include one or more of the following:

a) A user ID number, which may be assigned sequentially (for example, a 16-bit user ID number may provide for up to 64K users, although the present invention is not limited to 64K users);

b) The user's logo, consisting of the user's photograph or other distinguishing graphic. This represents the link between the user and his or her profile;

c) An identification of the last channel (cable, satellite, etc.) selected by the user;

d) The number of channels defined for this user (from 1 to 979 channels from among the 64K possible channels, for example—although 64K channels is merely an exemplary and non-limiting number of possible channels);

e) The channel table, which includes the list of channels assigned to this user, together with its associated logo (note that two or more users may access to the same channel through different logos);

f) The user's personal password, which enables the user to protect his or her profile from other users of the device. The user may also lock a recording from unauthorized access through the use of his or her password;

g) The default recording quality for recordings made for this user. This default recording quality specifies the quality of any recording by this user unless overridden by the user or specified by the program to be recorded or some other source such as a programming guide, for example. The default recording quality may, for example, be one of three possible quality levels, such as "Film" (best quality recording), "Documentary" (medium recording quality) or "News" (lowest recording quality, and/or h) The user's applications table. This table defines the user's access rights to the applications loaded onto the present interactive TV device and the location of user and application-specific data.

Channel Configuration General Module

A channel configuration general module 1112 loaded on the present interactive TV device enables the configuration and management of channels. According to an embodiment of the present invention, the channels may be organized into four principal groups; namely, tuner channels, satellite channels, Web channels and resource channels, for example. The channels may have characteristics that are common to all channels across groups and characteristics that are only associated with individual channels and/or to channels within a group.

According to an embodiment of the present invention, the channel configuration information that is common to all channels across groups, according to an embodiment of the present invention, may include:

A) The channel ID. The channel ID may be assigned sequentially and enables a unique identification of each channel within the device. This (16-bit, for example) number is preferably internal to the interactive TV device and unknown to the user.

B) The channel type. The channel type information enables the identification of the type of channel and dictates the choice of software module that is used to initialize the channel. The type of channel information may be stored in a table, which may specify a number of channel types, such as tuner, VCR, DVD, Web, Camera, Auxiliary and Satellite, for example.

C) The logo associated with the channel. The channel logo represents the link between the channel and the user. For the user, the channel logo identifies a channel (although the same logo may be associated with more than one channel). For example, each channel logo may be identified with a unique (32-bit, for example) logo identifier (logo ID);

D) Personalized Settings. The personalized setting enable the user to modify various characteristics of the composite video signal, including, for example, contrast, brightness, color saturation, tint, volume and the like.

Channels of the "tuner" type enable the user to access analog video streams over the analog bus 138 (see FIG. 1). Each channel requires that one of the tuners (see reference numeral 108 in FIG. 1) of the present interactive TV device be tuned to a specific frequency. Each tuner channel is addressed by a channel number, which channel number associates a frequency range to a number. For example, when a user wishes to view CNN® and enters the channel number 20 for CNN®, the present device selects the optimum frequency for best reception within the range of frequencies for that channel number, in real time. The information that is associated only with channels of the "tuner" type include the channel number, the source (e.g., cable or antenna), the country which, together with the channel type enables the determination of the frequencies of the available channels and the video format (e.g., NTSC, PAL or SECAM).

Channels of the "Satellite" type are digital channels that may be accessible via the DVB bus (see bus 128 in FIG. 1). The information that is unique to satellite channels may include the address of the channel, the transponder to which the channel belongs and the video format of the channel (e.g., NTSC, PAL or SECAM).

"Web" channels are digital channels that enable Internet access and display Web pages of specific Web servers. Once the Web channel is launched, Web channels allow Web surfing in the customary manner. The only information that is initially necessary is the Universal Resource Locator (URL) of the Web server of the desired homepage (which may be an offline homepage).

Channels of the type "Resource" belong to an umbrella category established to group all the remaining resources available to the present interactive TV device. These channels each have a unique resource channel identifier within a reserved range of 980 to 1001 (for example), which enables the present interactive device to distinguish between them and apply appropriate processing to each type of resource. A correspondence table may be provided to associate the resource channel identifiers with specific resources. For example, the resource channel identifiers may be allocated in the following manner: 980 to 989 reserved for Blue Tooth-enabled devices, 990 reserved for the camera channel (output from the camera 504), 991 reserved for auxiliary devices, 997 for the PVR (personal video recorder configured to digitally record and store video on the disk storage 166—see FIG. 1—or other mass storage device), 998 for the DVD channel (video output form the integrated DVD player/recorder 516) and resource channel identifier 1001 may be reserved for settings relative to the tuner and satellites channels. Other channel assignments may be made within the context of the present invention, as those of skill may recognize.

Data Structures

According to an embodiment of the present invention, the interactive TV device may operate upon four base indices. These base indices may include:

1) a 16-bit (for example) channel ID base index 1114 (for 64K possible channels of which the first 10 may be assigned automatically upon initialization of the device and sequentially thereafter);
2) an 8-bit (for example) application ID base index 1116 (for a potential 255 definable applications in the exemplary case wherein the application ID base index is an 8-bit number, only one being shown in FIG. 11), wherein ID1 is preferably assigned to the "Home" application to be detailed below, ID2 is preferably assigned to a videoconferencing application as also detailed below, the remaining applications being assigned an application ID in a sequential manner;
3) a 16-bit (for example) user ID base index 1118, assigned upon the addition of a new user, and
4) a 32-bit (for example) logo ID base index 1120, assigned sequentially upon creating or obtaining a logo (by cutting a .JPG logo from a corporate Web page, for example);

From these four base indices, any combination of user, resource, channel and logo may be defined, to enable each user to utilize the resources of the present device and to personalize their interactive TV experience. Preferably, none of the four base indices 1114, 1116, 1118 and 1120 include any application-specific information, to enable the applications to remain independent of the base indices and to utilize the base indices in any desired manner.\

The present interactive TV device may maintain a base data structure 1128 containing general and current system information. The base data structure 1128 may include, for example, the User ID of the current user, the total number of assigned user IDs, the total number of assigned channel IDs, the total number of application IDs defined within the device, the system password, and general settings, such as contrast, brightness, hue, saturation and volume, for example.

As also shown in FIG. 11, the present interactive TV device may also include one or more application data structures 1126, each associated with an application 1130 loaded and/or running on the device. According to an embodiment of the present invention, each application data structure 1126 may include information that is required by and specific to the associated application 1130. An application data structure 1126 may include:

a) an application number, which may be a chronologically and sequentially assigned unique number assigned at the time the associated application was installed;
b) a description of the application, and
c) any application-specific information.

The present interactive TV device may also include a plurality of channel data structures 1124. According to the present invention, each of the resources available to the interactive TV device is utilized and treated as a channel. The channel data structures 1124, therefor, describe the resources. Each channel data structure 1124 may include one or more (or all) of the following:

a) the channel ID, which is a chronologically assigned channel identifier;
b) the type of channel (tuner, satellite, PVR, DVD, Web, Camera, Auxiliary, for example);
c) the logo associated with the channel;
d) the address (e.g., frequency) of the channel and the multi-channel package to which the channel belongs;
e) the type of antenna (antenna or cable);
f) the country for the tuner frequency range;
g) the video format (e.g., NTSC, PAL, SECAM, etc.);
h) personalized settings, such as contrast, brightness, hue, saturation, sound volume;
i) the URL address associated with the channel (for Web channels).

One or more of the available channels may be reserved and dedicated to specific resources, such as camera, auxiliary, DVD, PVR and/or settings, for example.

Each application 1130 may manage its own user data structure 1122. This enables each application to manage its own data, to keep confidential private or business information secure, for example. Each user data structure may include one or more of the following:

a) the user ID;
b) the last used tuner channel;
c) the number of channels defined for the user;
d) the user's password;
e) the user's default recording speed;
f) the user's picture (managed in the same manner as a logo);
g) the channel table (contains channel IDs and logos);
h) the user's application table, including access authorizations and the address of the application and user-specific data.

The Home Application

As shown in FIG. 12, the home application 1200 utilizes information contained in the data structures 1122, 1124, 1126 and 1128 and the base indices 1114, 1116, 1118 and 1120 that are updated by the general modules 1106, 1108, 1110 and 1112. The home application enables the present interactive TV device to:

a) display a tuner channel;
b) display a satellite channel;
c) display a video recording;
d) display a DVD video;
e) display a Web site;
f) record a tuner channel;
g) record a satellite channel;
h) cause programmed events to execute;
i) edit a video;
j) carry out a videoconference.

As shown in FIG. 12, the home application 1200 may include a master module 1218 that controls a number of slave modules 1202-1216 as well as the resources 1220 available to the interactive TV device (keyboard 518, camera 504, cursor, DVD 516, pointing device 520 etc.) and allocates them according to the requirements of the currently operating and/or future tasks. To insure an orderly operation of all of the tasks, the master module 1218 and the slave modules 1202-1216 may communicate using a master-slave protocol wherein all communications are initiated by the master module 1218. The slave modules 1202-1216 may interact with one another, as may be the case wherein the slave module managing recordings (1210) interacts with the slave module that displays channels (1202). The interaction between slave modules, however, is preferably managed by the master module 1218. When an event occurs requiring a slave module 1202-1216, all of the information related to the event (from a keyboard 518, cursor or other resource) is received by the master module 1218 which then sends all required information to the appropriate slave module(s) 1202-1216.

As shown in FIG. 12, the home application 1200 may include the following:

a) A channel display slave module 1202. Functionally, the channel display slave module 1202 analyzes the resource needs of a channel as a function of the channel type (e.g., tuner, satellite, DVD, Web, etc.). The channel display slave module 1202 then requests all necessary resources from the master module 1218 and configures the allocated resources to launch the channel on the display 802. The channel display slave module 1202 is called by all of the slave modules that must display a channel.

b) A recording manager slave module 1204. This slave module manages the library of video recordings (copy, deletion, transfer to and from disk 166, DVD-RAM, etc.), the selection of a recording and the launch of a playback of a previous recording.

c) A DVD manager slave module 1206. This slave modules enables the launch of a playback of a DVD disk and to manage all of the common functions of a DVD reader/recorder such as shown at 516 in FIG. 5, including menu, language, chapter, angle, up, down, left, right, valid, playback, fast forward, fast backward, pause, stop and slow motion, for example. This same module 1206 may also be invoked upon the playback and display of a digital recording (thereby providing the conventional PVR functions of playback, pause, fast-forward, etc.).

d) A videoconference slave module 1216. This slave module manages the users (videoconference participants), establishes the video link with the remote videoconference participant(s), controls the local and remote camera(s) (such as shown at 504 in FIGS. 4 and 5) and controls the video and audio streams to insure the success of the videoconference.

e) An events manager slave module 1208. This slave module manages all current and future events within the present interactive TV device. The events manager slave module 1208 may access an events database 1222 (or some other structure configured to store events information), which may include an entry for each current and future event carried out or to be carried out by the home application 1200 running on the present interactive TV device. The events database 1222 may, according to an embodiment of the present invention, store an event ID, which is a chronologically-assigned number for each event, an indication of the type of event (display of a channel, recording of a channel, etc.), the frequency of the event, the start and end date and time of the event, the channel to record, the source and destination of the event (to copy a video stream, for example), the priority of the event, the speed of the recording, the user-owner of the event, the type of event, the password assigned to the event by the user and/or a description of the event, for example.

f) A recording manager slave module 1210, which manages all recordings made on the present interactive TV device;

g) A-30 minutes manager slave module 1212, which enables, for example, the playback of a video stream to resume at a point in time that is 30 minutes prior to the current playback time (in effect, a function that plays back the last 30 minutes of video), and h) A video editor slave module 1214, which enables the user to edit a stored video stream using a full function video editor.

The master module 1218 may also access a library database 1224 (or some other structure configured to store library information). The library database 1224 may be configured to enable the slave modules 1202-1216 and/or the master module 1218 to manage the video and/or sound recordings stored within the present interactive TV device. According to an embodiment of the present invention, the recording library database 1224 may store an entry (a record in a table, for example) for each recording present within the present within, accessible to (via an external drive, for example) and/or created by the present interactive TV device. Indeed, such recordings may be physically located within the device (on a magnetic hard disk drive such as shown at 166 in FIG. 1, for example) and/or on a compact disk or DVD-RAM recorded by the present interactive device. Alternatively still the library database 1224 may include entries of recordings stored at a remote location (such as a remote server) and accessible though a network, such as shown at 510 in FIG. 5. The library database 1224 may store, for each recording, the name of the recording, a description of the recording, the location (e.g., address) of the recording on the hard disk (see, for example reference 166 in FIG. 1), on a DVD-RAM and/or on the network 510 such as an Internet Protocol (IP) address on the network 510, the date of the recording, the time of the recording, the duration of the recording, the channel from which the recording was made, the user of the recording, the type of recording and/or the password (if any) associated with the recording, for example.

FIG. 13 shows two participants A and B engaged in a videoconference utilizing the present interactive TV devices 502 and/or the auto-tracking videoconference camera 400 of the present invention. It is understood that participants A and B form no part of the present invention and are shown herein as stick figures for reference purposes only. As shown, an interactive TV device 502$_1$ is oriented facing participant A such that the auto-tracking camera 504 thereof fixes videoconference participant A in its field of view. Similarly, the interactive TV device 502$_2$ or the auto-tracking camera 400 is disposed facing participant B. Participants A and B may be geographically separated from one another, while the interactive TV device 502$_2$ or the auto-tracking camera 400 may be coupled to one another through a high speed connections to the network 510. The interactive TV device 502$_1$ is connected to a display 508$_1$ while the interactive TV device 502$_2$ or the auto-tracking camera 400 is connected to a display 508$_2$. By selecting the videoconferencing application (thereby invoking the videoconference slave module 1216 of FIG. 12), the users may carry out a full motion, real time videoconference. For example, user A may choose to use two quarter screen 1304 and 1306 of the display 508₁ to show images of user B and him or herself, respectively. The right-hand side of the display 508₁ may show a pull out strip 746 that displays icons and other information relevant to the configuration of the in-progress videoconference. A visual indicator on the pull out strip 746, such as the colored strip 1308 may be provided to indicate, for example, that horizontal scrolling is available. Similarly, each of the quarter screens 1304 and 1306 may also include a visual indicator 1310 (such as a thin colored strip) to indicate a properly configured connection between user A and user B. Alternatively, the visual indicator may inform the user of the state of the currently active quarter screen(s) by position and/or color, for example. For a recording for example, the visual indicator 1310 may be located to the left hand side of the quarter screen when the recording is proceeding normally and may be located at the bottom of the quarter screen when the recording is not proceeding normally. Alternatively still the colored strip 1308 may be green in color when the videoconference between users A and B is properly configured and may be turned to red when improperly configured, when excessive network traffic interferes with the videoconference or to indicate some other problem. Other combinations of strip position and/or color may be implemented within the context of the present invention. For example, audio signals may also alert the user of the state of any of the currently active quarter screens. Such visual indicators are preferably always visible, without any action by the user. As shown at 508₂, each participant may choose to view the other participant(s) in full screen mode.

The present invention and the system shown in FIG. 13 are also well suited to face-to-face videoconferencing activities within the ecommerce arena. Indeed, the present invention allows consumers to directly interface directly with real human (or virtual) representatives of online merchants for the purpose of ordering goods and services. Such applications are disclosed in co-pending and commonly assigned U.S. patent application Ser. No. 09/514,041, entitled "Methods, Systems and Apparatus For Electronic Face-To-Face Business And Retail Brokerage" filed on Feb. 25, 2000, the disclosure of which is hereby incorporated herein in its entirety.

While the foregoing detailed description has described preferred embodiments of the present invention, it is to be understood that the above description is illustrative only and not limiting of the disclosed invention. Other modifications may occur to those of skill in this art. Thus, the present invention to be limited only by the claims as set forth below.

What is claimed is:

1. A system, comprising:
    a base comprising a circular end; and
    a body comprising a circular first end and a second end configured to be removably coupled to an end of a camera that includes an infrared receiver configured to receive a coded infrared signal from an electronic tag configured to be worn on an object determined to have a defined characteristic of a person to enable the camera to target the object, the circular first end of the body configured to be removably coupled to the circular end of the base to enable a plurality of stacked ring components to be coupled between the circular end of the base and the circular first end of the body, wherein the plurality of stacked ring components are configured to perform respective predetermined functions.

2. The system of claim 1, wherein the base includes a connector for at least one of reception of power, a video signal, or a control signal.

3. The system of claim 1, further comprising a ring component coupled between the base and the body, wherein the ring component comprises a battery to power the camera.

4. The system of claim 1, further comprising a ring component between the base and the body, wherein the ring component comprises an electric motor and a controller coupled to the electric motor, and wherein the controller is configured to rotate the camera along an axis.

5. The system of claim 1, further comprising a ring component between the base and the body, wherein the ring component comprises a wireless communication device.

6. The system of claim 1, further comprising a ring component between the base and the body, wherein the ring component comprises a processor configured to process at least one of an analog video stream or a digital video stream.

7. The system of claim 1, further comprising a ring component between the base and the body, wherein the ring component comprises a processor configured to execute a videoconferencing application.

8. The system of claim 1, wherein the camera is configured to track the object determined to have the defined characteristic.

9. The system of claim 8, wherein the camera is movable along at least a first axis and a second axis.

10. The system of claim 9, further comprising an auto-tracking analog controller configured to control the camera using analog signals determined from a video composite signal generated by the camera.

11. The system of claim 10, wherein the auto-tracking analog controller comprises:
    a separator configured to separate scan lines signals and frame signals from the video composite signal;
    a horizontal displacement controller configured to generate a move left signal and a move right signal from the scan lines signals and the video composite signal to control movement of the camera along the first axis; and
    a vertical displacement controller configured to generate a move up signal and a move down signal from the frame signals and the video composite signal to control movement of the camera along the second axis.

12. The system of claim 11, wherein the horizontal displacement controller is further configured to perform a comparison of a horizontal position of an object determined to have the defined characteristic as determined from the scan lines signal and the video composite signal with a past horizontal position of the object and selectively output the move right signal or the move left signal based upon a result of the comparison.

13. The system of claim 11, wherein the vertical displacement controller is configured to perform a comparison of a vertical position of an object determined to have the defined characteristic as determined from the frame lines signal and the video composite signal with a past vertical position of the object and selectively output the move up signal or the move down signal based upon a result of the comparison.

14. The system of claim 1, further comprising a signal processing device, the signal processing device comprising:
    an input configured to receive a plurality of input streams;
    an output configured to selectively output a plurality of output streams;
    a first digital bus with an uninterrupted connection between the input and output;
    an analog bus connected between the input and the output, wherein the analog bus comprises a video signal decoder coupled to the input and a video signal encoder coupled to the output; and a graphics processing assembly coupled to the first digital bus and to the analog bus.

15. The system of claim 14, wherein the input is configured to receive an input stream from at least one of the camera, an analog video source, a digital video source, an Internet protocol connection, an infrared connection, or an output of a video camera.

16. The system of claim 14, wherein the output is configured to selectively output a stream to at least one of a television interface, a modem, a wireless data port, an infrared connection, or an interface of the camera.

17. The system of claim 14, wherein the digital bus is configured as a digital video bus.

18. The system of claim 14, wherein the input comprises an input multiplexer configured to selectively route an input stream of the plurality of input streams to at least one of the digital bus or the analog bus.

19. The system of claim 18, wherein the output comprises an output multiplexer configured to selectively route the input stream from the at least one of the digital bus or the analog bus to the output.

20. The system of claim 14, wherein the video signal encoder includes at least one of a phase alternating line encoder, a national television system committee encoder, or a sequential color with memory decoder.

21. The system of claim 14, wherein the video signal decoder includes at least one of a high-definition television decoder, a phase alternating line decoder, a national television system committee decoder, or a sequential color with memory decoder.

22. The system of claim 14, further comprising a memory accessible via a command bus that is coupled to the input, the output, and the graphics processing assembly.

23. The system of claim 22, further including a processor coupled to the analog bus and the command bus and configured to monitor a state of the signal processing device, and to monitor and regulate traffic on the analog and command buses.

24. The system of claim 14, wherein the graphics processing assembly includes a hardware video encoder and a hardware video decoder coupled to the digital bus and the analog bus.

25. The system of claim 24, wherein the hardware video encoder and the hardware video decoder conform to a motion pictures expert group video standard.

26. The system of claim 24, further comprising a central processing unit coupled between an output of the hardware video encoder and an input of the hardware video decoder, and coupled to the digital bus.

27. The system of claim 1, wherein the electronic tag further comprises a microphone.

28. The system of claim 1, further comprising a microphone.

29. A system, comprising:
means for supporting the system, wherein the means for supporting comprises a circular end; and
means for coupling a video capture device, including an infrared receiver configured to receive a coded infrared signal from an electronic tag configured to be worn on an object determined to have a defined characteristic of a person to enable the video capture device to target the object, to the means for supporting, wherein the means for coupling comprises a circular first end and a second end configured to be removably coupled to an end of the video capture device, wherein the circular first end of the means for coupling is configured to be removably coupled to the circular end of the means for supporting to enable a plurality of means for expansion to be coupled between the circular end of the means for supporting and the circular first end of the means for coupling, and wherein respective means for expansion of the plurality of means for expansion are configured to carry out respective functions.

30. The system of claim 29, wherein the means for supporting includes a connector for at least one connection to a power source, a video signal source, or a control signal source.

31. The system of claim 30, further comprising a means for expansion coupled between the means for supporting and the means for coupling, wherein the means for expansion comprises a battery to power the camera.

32. The system of claim 29, further comprising a means for expansion coupled between the means for supporting and the means for coupling, wherein the means for expansion comprises a means for motion and a means for motion control coupled to the means for motion, and wherein the means for motion control is configured to rotate the video capture device along an axis.

33. The system of claim 29, further comprising a means for expansion coupled between the means for supporting and the means for coupling, the means for expansion comprising a means for wireless communication.

34. The system of claim 29, further comprising a means for expansion coupled between the means for supporting and the means for coupling, wherein the means for expansion comprises a means for processing configured to process at least one of an analog video stream or a digital video stream.

35. The system of claim 29, further comprising a means for expansion coupled between the means for supporting and the means for coupling, wherein the means for expansion comprises a means for processing configured to facilitate execution of a videoconferencing application.

36. The system of claim 29, wherein the video capture device is configured to track an object determined to have the defined characteristic.

37. The system of claim 36, wherein the video capture device is movable along at least a first axis and a second axis.

38. The system of claim 37, wherein the video capture device comprises means for tracking configured to control the video capture device using an analog signal derived from a video composite signal generated by the video capture device.

39. The system of claim 38, wherein means for tracking is configured to:
separate scan lines signals and frame signals from the video composite signal;
generate a move left signal and a move right signal from the scan lines signals and the video composite signal to control movement of the video capture device along the first axis; and
generate a move up signal and a move down signal from the frames signal and the video composite signal to control movement of the video capture device along the second axis.

40. A method, comprising:
removably coupling a first end of a body to an end of a camera including an infrared receiver configured to receive a coded infrared signal from an electronic tag configured to be worn on an object determined to have a defined characteristic of a person to enable the camera to target the object; and
removably coupling a circular second end of the body to a circular end of a base enabling a plurality of stacked ring elements that perform respective predetermined functions to be coupled between the circular end of the base and the circular second end of the body.

41. The method of claim 40, further comprising:
coupling a stacked ring element between the body and the base; and
powering the camera with a battery of the stacked ring element.

42. The method of claim 40, further comprising:
coupling a stacked ring element comprising a motor between the body and the base; and
rotating the camera along an axis by controlling the motor.

* * * * *